(12) United States Patent
Ikegaya

(10) Patent No.: US 9,678,408 B2
(45) Date of Patent: Jun. 13, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Yuki Ikegaya, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/013,053

(22) Filed: Feb. 2, 2016

(65) Prior Publication Data

US 2016/0223800 A1    Aug. 4, 2016

(30) Foreign Application Priority Data

Feb. 4, 2015   (JP) .................................. 2015-020173

(51) Int. Cl.
*G02B 15/14* (2006.01)
*G03B 13/32* (2006.01)
*G02B 15/173* (2006.01)

(52) U.S. Cl.
CPC ............ *G03B 13/32* (2013.01); *G02B 15/14* (2013.01); *G02B 15/173* (2013.01)

(58) Field of Classification Search
CPC .... G02B 15/173; G02B 15/177; G02B 15/14; G02B 13/04
USPC ................. 359/676, 680–682, 684, 686–688
See application file for complete search history.

(56) References Cited

U.S. PATENT DOCUMENTS 6,229,962 B1 * 5/2001 Imamura ......................... 396/79

FOREIGN PATENT DOCUMENTS

JP      2010-181543 A     8/2010
JP      2010-181787 A     8/2010

OTHER PUBLICATIONS

Yoshiya Matsui, Lens Design, Chapter 4, pp. 77-97.
U.S. Appl. No. 15/091,850, filed Apr. 6, 2016, Inventor Yuki Ikegaya.

* cited by examiner

*Primary Examiner* — James Greece
(74) *Attorney, Agent, or Firm* — Carter, DeLuca, Farrell & Schmidt, LLP

(57) ABSTRACT

Provided is a zoom lens including a plurality of lens units, in which an interval between each pair of adjacent lens units is changed during zooming, the plurality of lens units include a lens unit BR arranged closest to image side in zoom lens, which moves in optical axis direction during focusing and a lens element A arranged adjacent to lens unit BR on object side, having refractive power of sign opposite to that of lens unit BR, in which lens element A consists of a single lens or a cemented lens, and distance between surface closest to image side of lens element A and image plane at wide angle end, distance between surface closest to image side of lens element A and surface closest to object side of lens unit BR at wide angle end, and focal length of zoom lens at wide angle end are each appropriately set.

17 Claims, 18 Drawing Sheets

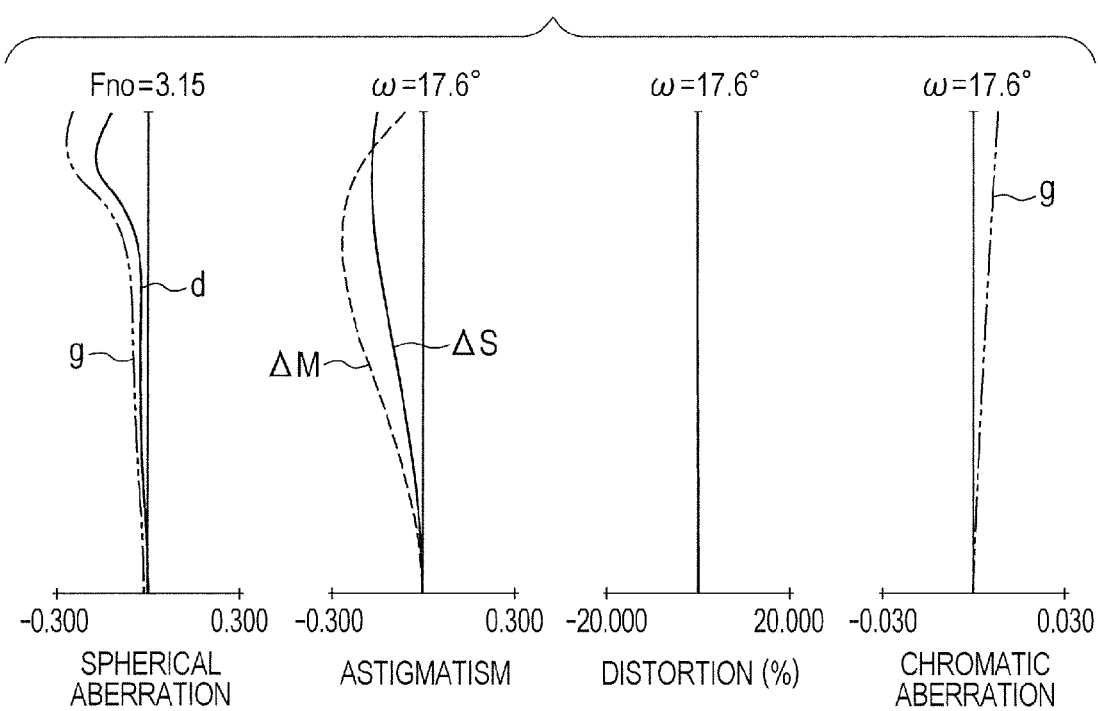
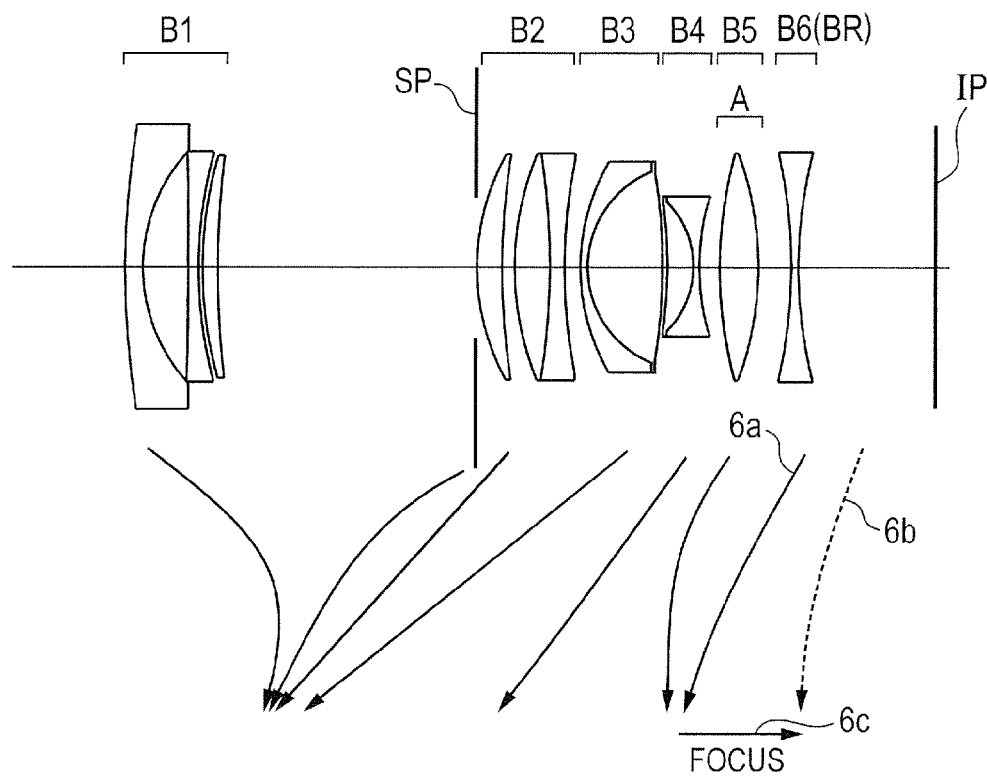

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable as an image pickup optical system for use with a photographic apparatus such as a digital still camera, a monitoring camera, or a silver-halide film camera.

Description of the Related Art

In recent years, an image pickup apparatus using a solid-state image pickup element is increased in functionality, and is downsized as the entire apparatus. As an image pickup optical system used with the image pickup apparatus, a zoom lens is required to have a short total lens length, a high zoom ratio, and a high resolution. As a zoom lens satisfying those requirements, for example, a zoom lens using a so-called "rear focus system" in which a lens unit other than the first lens unit arranged closest to an object side is used for focusing has been known.

One reason why the rear focus system is adopted is that, in a lens unit for focusing (hereinafter referred to as "focus lens unit"), a height of incidence h of an on-axis marginal ray is low, and hence an aberration variation (in particular, a variation in spherical aberration) during focusing may be reduced.

Another reason is that, when a size of the image pickup element used in the image pickup apparatus is small, the focus lens unit is reduced in weight and also in amount of extension during focusing, and hence the entire image pickup apparatus becomes easy to downsize. In addition, in recent years, in order to make the image pickup apparatus compact, electronic distortion correction in which, of various aberrations of the zoom lens used with the image pickup apparatus, distortion is electrically corrected in a wide angle range is often introduced. An image pickup apparatus in which electronic distortion aberration correction is introduced is advantageous in making the image pickup apparatus compact. However, a problem in that the aberration variation during focusing becomes large has been known.

In aberration theory, a process of focusing from a long distance to a short distance can be divided into a process in which an object distance moves from the long distance to the short distance (object distance movement) and a process in which the focus lens unit is moved to focus on the object distance (focus lens unit movement). When the aberration theory is used, it can be seen that a variation in field curvature is increased theoretically during the object distance movement, and that a variation in field curvature during focusing also tends to be increased. This is proved based on the fact that, according to Yoshiya Matsui "Lens Design", Chapter 4, a third-order aberration coefficient V of distortion is large, and hence a variation amount of a third-order aberration coefficient III of astigmatism during the object distance movement:

$$(\Delta III)_1 = -\delta(V + II^s) + \delta^2 I^s$$

also becomes large ($\delta$ represents an object distance movement parameter, $II^s$ represents a third-order aberration coefficient of coma of a pupil, and $I^s$ represents a third-order aberration coefficient of spherical aberration of the pupil). However, when the size of the image pickup element is small, the variation in field curvature during focusing is inconspicuous, and the problem is hardly addressed.

For example, in Japanese Patent Application Laid-Open No. 2010-181787, a zoom lens in which a rear focus system is adopted and electronic distortion correction is introduced in a negative lead type including a lens unit having a negative refractive power closest to an object side is disclosed. Moreover, in Japanese Patent Application Laid-Open No. 2010-181543, a zoom lens in which a rear focus system is adopted and electronic distortion correction is introduced in a positive lead type including a lens unit having a positive refractive power closest to an object side is disclosed.

The zoom lens using the rear focus system makes it easy to reduce the size and weight of the focus lens unit, and to focus quickly. However, the aberration variation tends to increase during focusing. Moreover, in general, when the image pickup element used in the image pickup apparatus is increased in size, the zoom lens used with the image pickup apparatus is required to have high optical characteristics over the entire zoom range and the entire object distance. For example, it is required that the aberration variation during focusing be small, and that the variation in field curvature be small in order to maintain the high optical characteristics over the entire image plane.

On the other hand, in the zoom lens used with the image pickup apparatus having a function of performing the electronic distortion correction, an increase in distortion aberration is permitted, and hence it becomes easy to realize a wide angle of view and the downsizing of the zoom lens. However, in such a zoom lens, during focusing in the wide angle range, the variation in field curvature and the variation in spherical aberration are increased.

In general, in the zoom lens, in order to obtain the high optical characteristics over the entire image plane with the small aberration variation during focusing while having a predetermined photographing angle of view, it becomes necessary to appropriately set the zoom type, the refractive power and a lens configuration of the focus lens unit, and the like. Further, it becomes necessary to appropriately set lens configurations and the like of lens units located on the object side of the focus lens unit.

SUMMARY OF THE INVENTION

According to one embodiment of the present invention, there is provided a zoom lens, including a plurality of lens units, in which an interval between each pair of adjacent lens units is changed during zooming, in which the plurality of lens units include:

a lens unit BR arranged closest to an image side in the zoom lens, which is configured to move in an optical axis direction during focusing; and a lens element A arranged adjacent to the lens unit BR on an object side, having a refractive power of a sign opposite to a sign of a refractive power of the lens unit BR, in which the lens element A consists of one of a single lens and a cemented lens, and in which the following conditional expressions are satisfied:

$$0.2 < di/fw < 1.4; \text{ and}$$

$$0.2 < df/fw < 1.2,$$

where di represents a distance between a surface closest to the image side of the lens element A and an image plane at a wide angle end, df represents a distance between the surface closest to the image side of the lens element A and a surface closest to the object side of the lens unit BR at the wide angle end, and fw represents a focal length of the zoom lens at the wide angle end.

Further features of the present invention will become apparent from the following description of exemplary embodiments with reference to the attached drawings.

BRIEF DESCRIPTION OF THE DRAWINGS

FIG. 9C is an aberration diagram of the zoom lens according to Example 3 when focusing on the object at the short distance at the telephoto end.

FIG. 10 is a lens cross-sectional view of a zoom lens according to Example 4 of the present invention when focusing on the object at infinity at the wide angle end.

DESCRIPTION OF THE EMBODIMENTS

Now, exemplary embodiments of the present invention are described in detail with reference to the attached drawings. A zoom lens according to the present invention is a zoom lens including a plurality of lens units, in which an interval between each pair of adjacent lens units is changed during zooming. A lens unit BR arranged closest to an image side in the zoom lens is configured to move in an optical axis direction during focusing. A lens element A arranged adjacent to the lens unit BR on an object side consists of a single lens or a cemented lens, and a sign of a refractive power of the lens element A is opposite to a sign of a refractive power of the lens unit BR.

Figure 1:
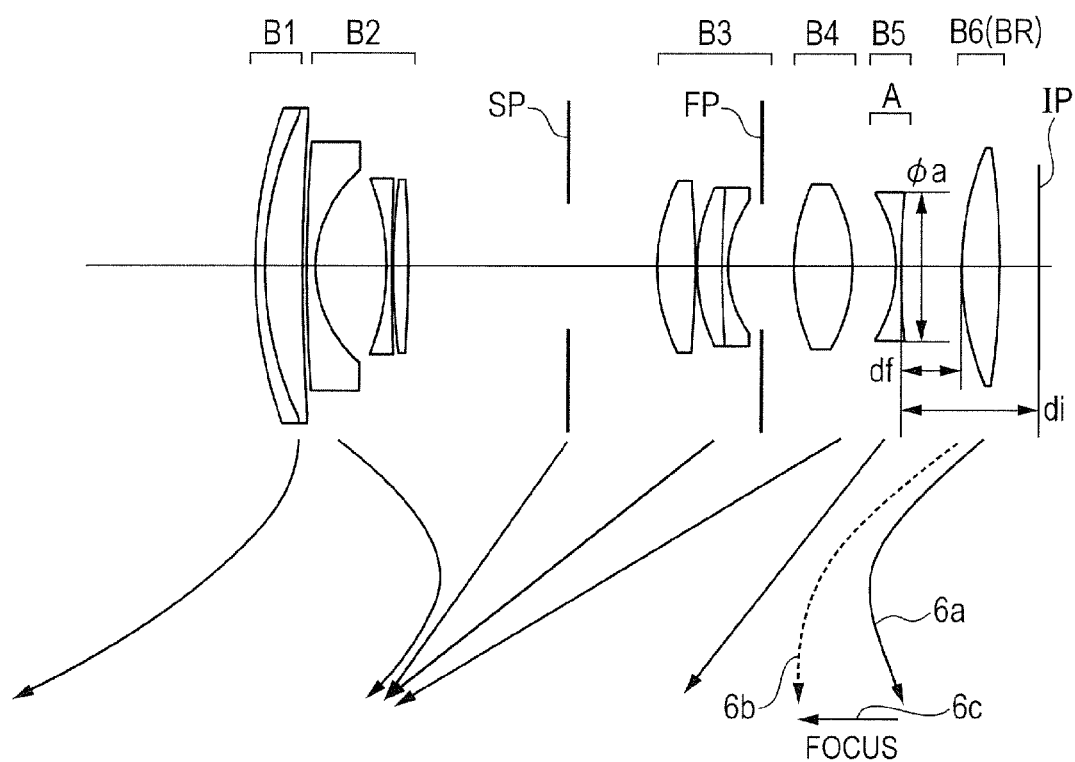
FIG. 1 is a lens cross-sectional view of a zoom lens according to Example 1 of the present invention when focusing on an object at infinity at a wide angle end.

FIG. 1 is a lens cross-sectional view of Example 1 of the zoom lens according to the present invention when focusing on an object at infinity at a wide angle end (short focal length end).

Figure 2A:
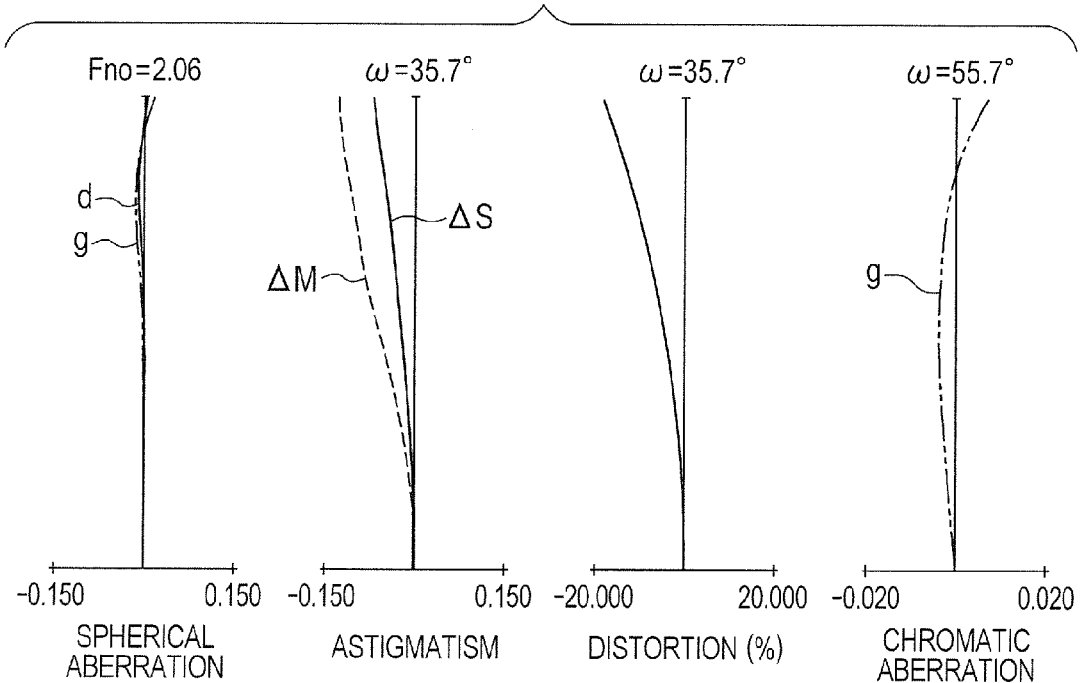
FIG. 2A is an aberration diagram of the zoom lens according to Example 1 when focusing on the object at infinity at the wide angle end.
Figure 2B:
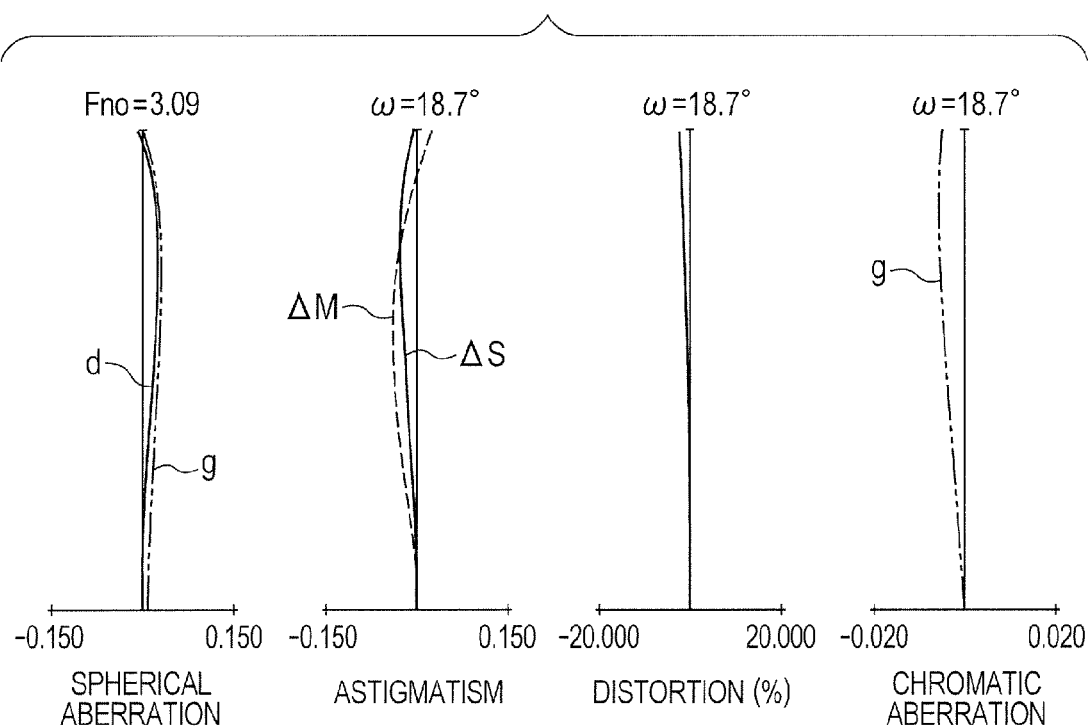
FIG. 2B is an aberration diagram of the zoom lens according to Example 1 when focusing on the object at infinity at an intermediate zoom position.
Figure 2C:
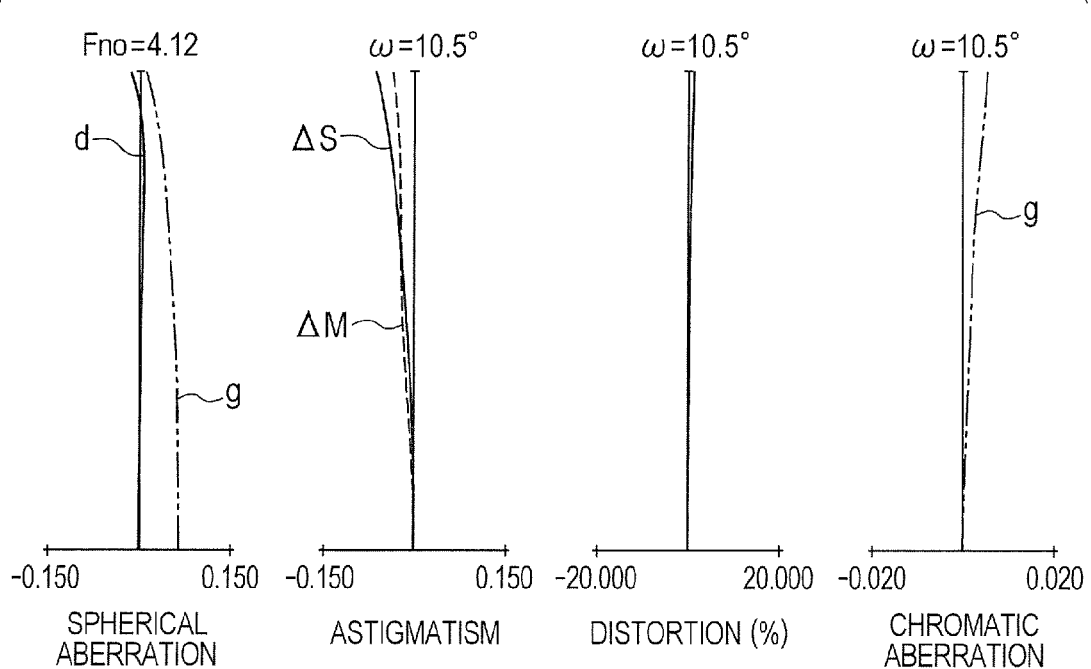
FIG. 2C is an aberration diagram of the zoom lens according to Example 1 when focusing on the object at infinity at a telephoto end.
Figure 3A:
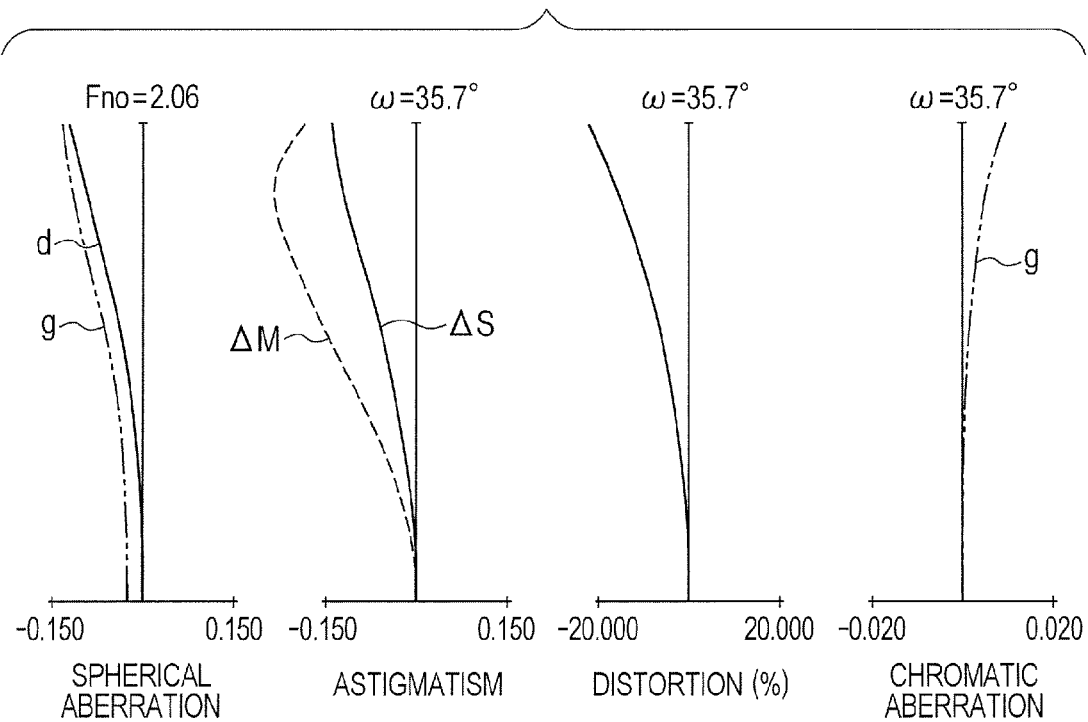
FIG. 3A is an aberration diagram of the zoom lens according to Example 1 when focusing on an object at a short distance at the wide angle end.
Figure 3B:
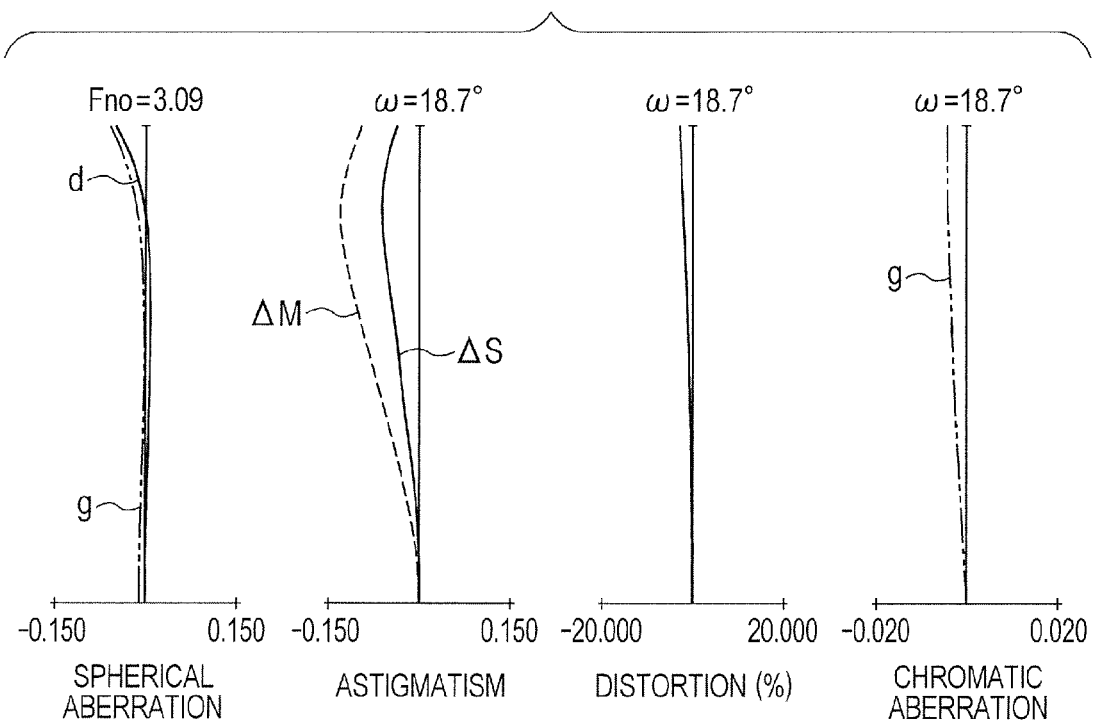
FIG. 3B is an aberration diagram of the zoom lens according to Example 1 when focusing on the object at the short distance at the intermediate zoom position.
Figure 3C:
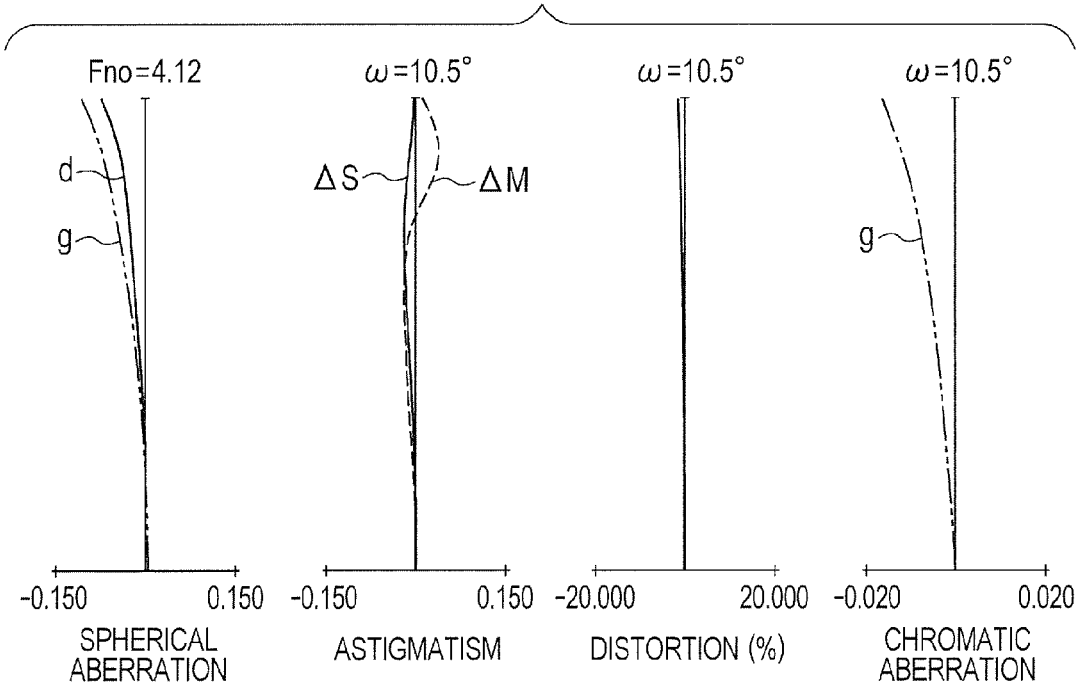
FIG. 3C is an aberration diagram of the zoom lens according to Example 1 when focusing on the object at the short distance at the telephoto end.

FIG. 2A, FIG. 2B, and FIG. 2C are longitudinal aberration diagrams of the zoom lens according to Example 1 when focusing on the object at infinity at the wide angle end, an intermediate zoom position, and a telephoto end (long focal length end), respectively. FIG. 3A, FIG. 3B, and FIG. 3C are longitudinal aberration diagrams of the zoom lens according to Example 1 when focusing on an object at a short distance at the wide angle end, the intermediate zoom position, and the telephoto end, respectively. The "object at a short distance" as used herein refers to an object at a position 50 millimeters (mm) toward the object side from the first lens surface at the wide angle end, 500 mm toward the object side from the first lens surface at the intermediate zoom position, and 500 mm toward the object side from the first lens surface at the telephoto end. Note that, the object distance is a value expressing Numerical Examples, which are to be described later, in mm. The same applies to each of Examples.

Figure 4:
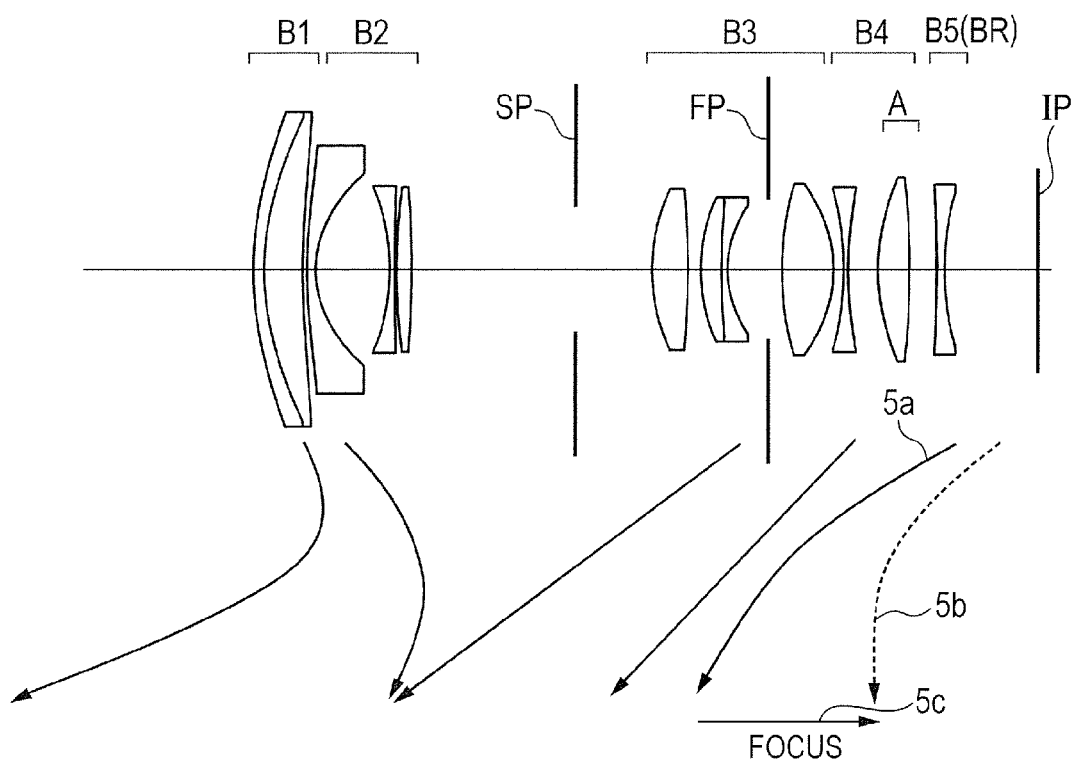
FIG. 4 is a lens cross-sectional view of a zoom lens according to Example 2 of the present invention when focusing on the object at infinity at the wide angle end.
Figure 5A:
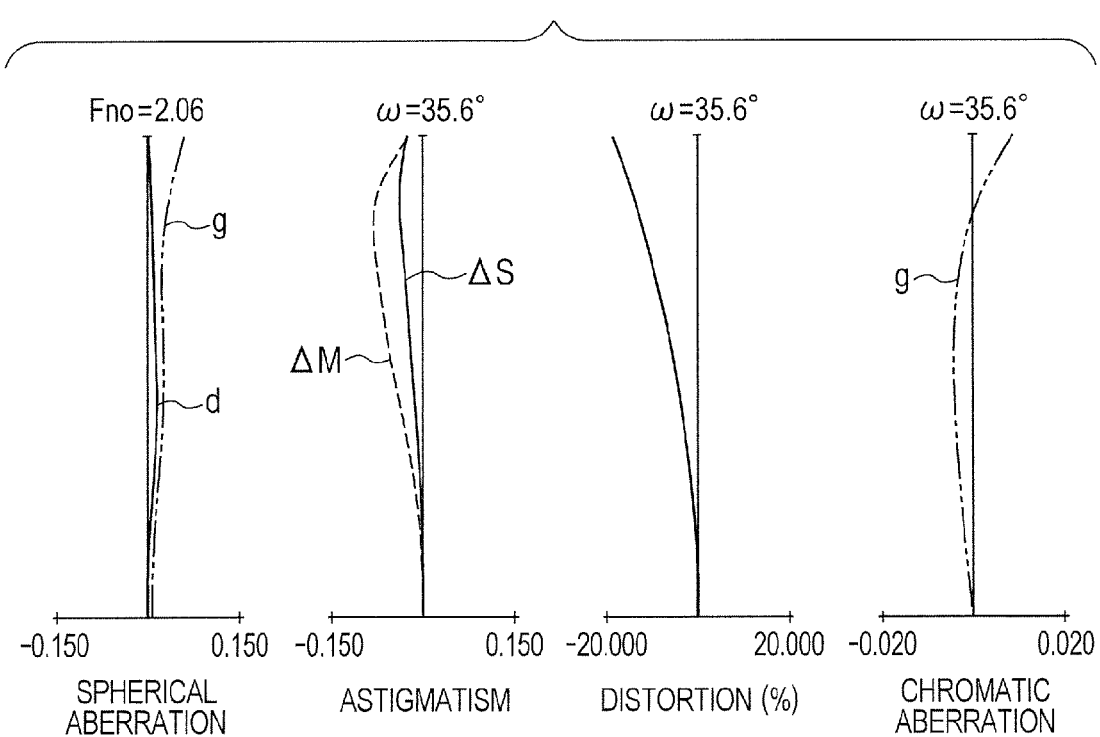
FIG. 5A is an aberration diagram of the zoom lens according to Example 2 when focusing on the object at infinity at the wide angle end.
Figure 5B:
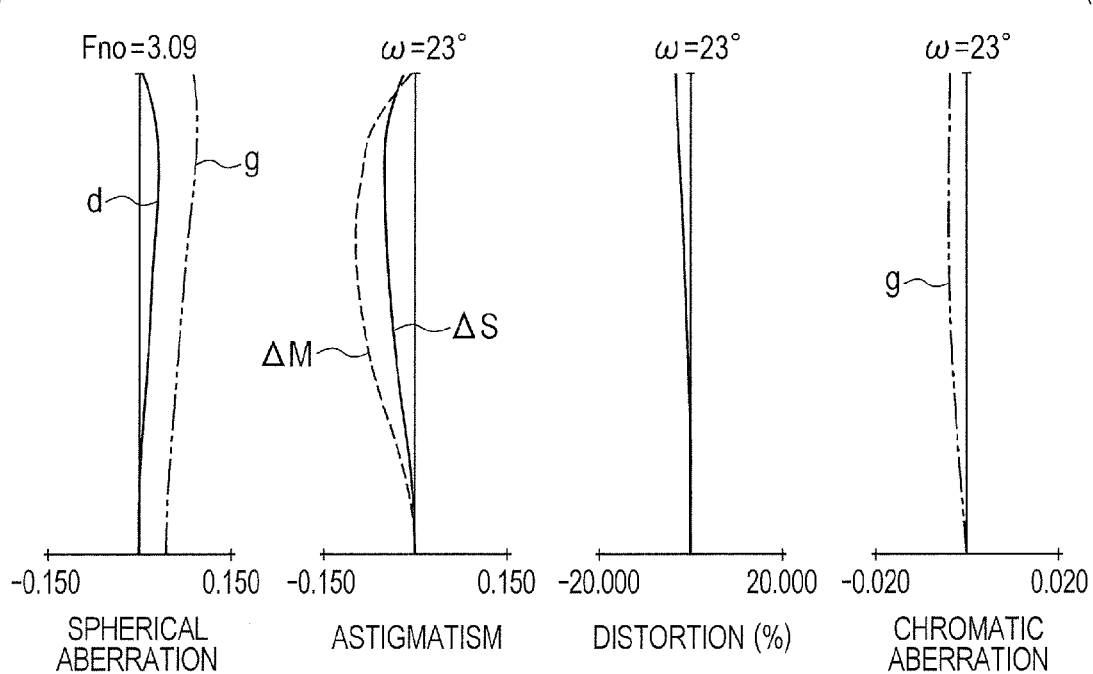
FIG. 5B is an aberration diagram of the zoom lens according to Example 2 when focusing on the object at infinity at the intermediate zoom position.
Figure 5C:
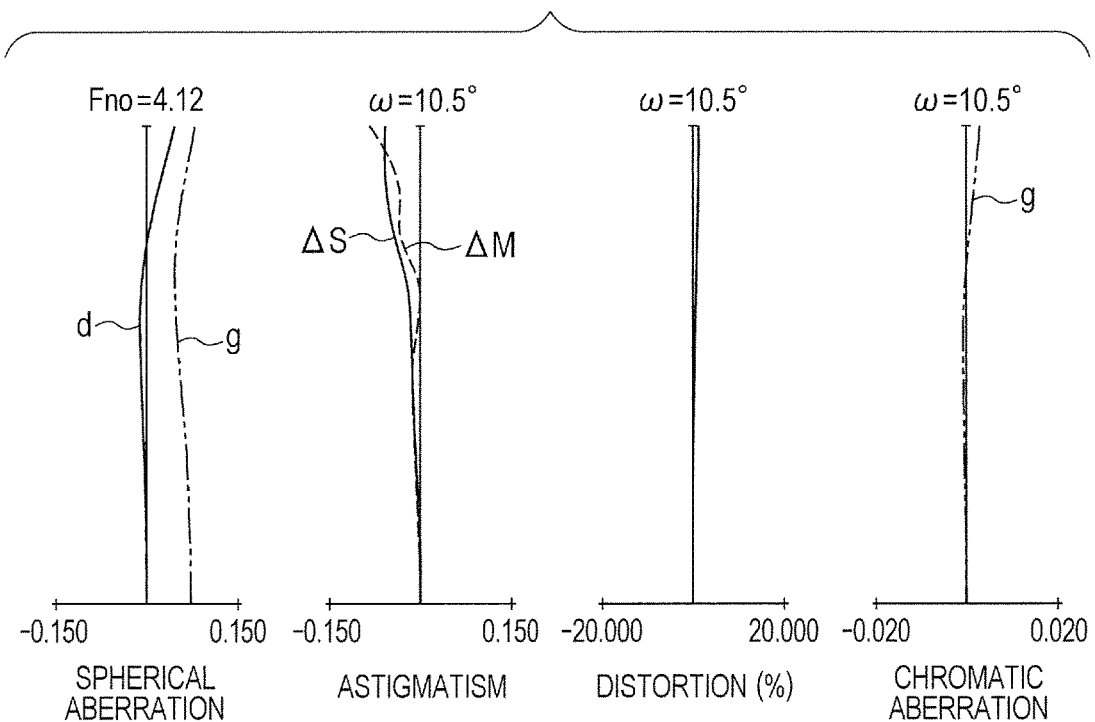
FIG. 5C is an aberration diagram of the zoom lens according to Example 2 when focusing on the object at infinity at the telephoto end.
Figure 6A:
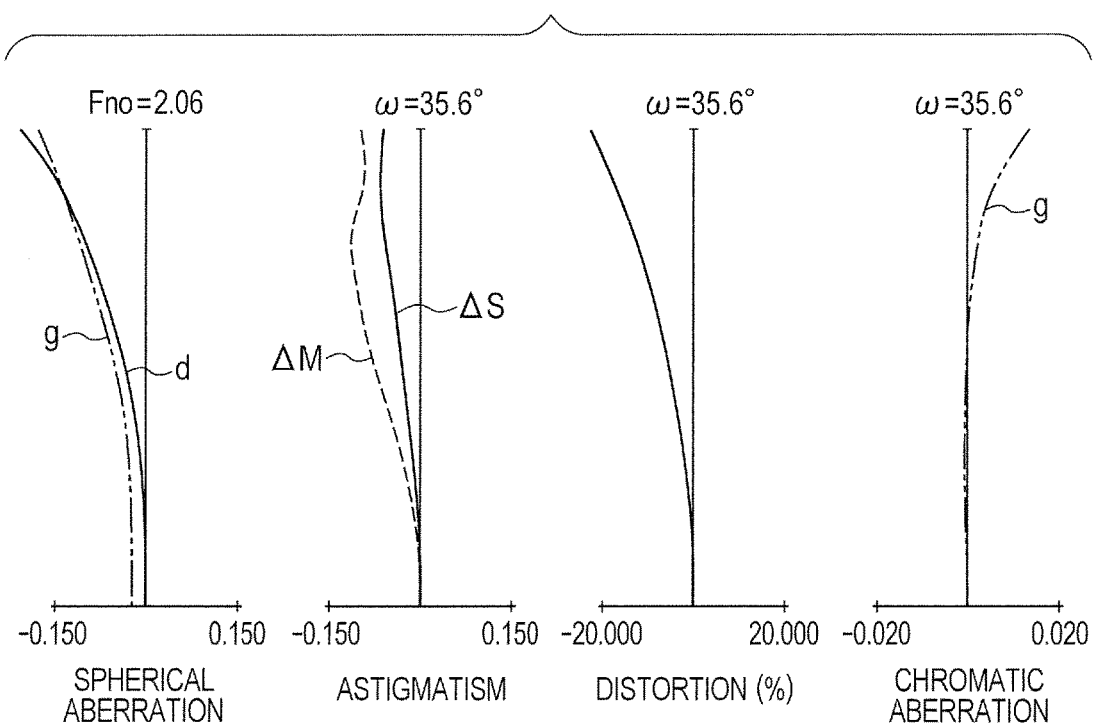
FIG. 6A is an aberration diagram of the zoom lens according to Example 2 when focusing on the object at the short distance at the wide angle end.
Figure 6B:
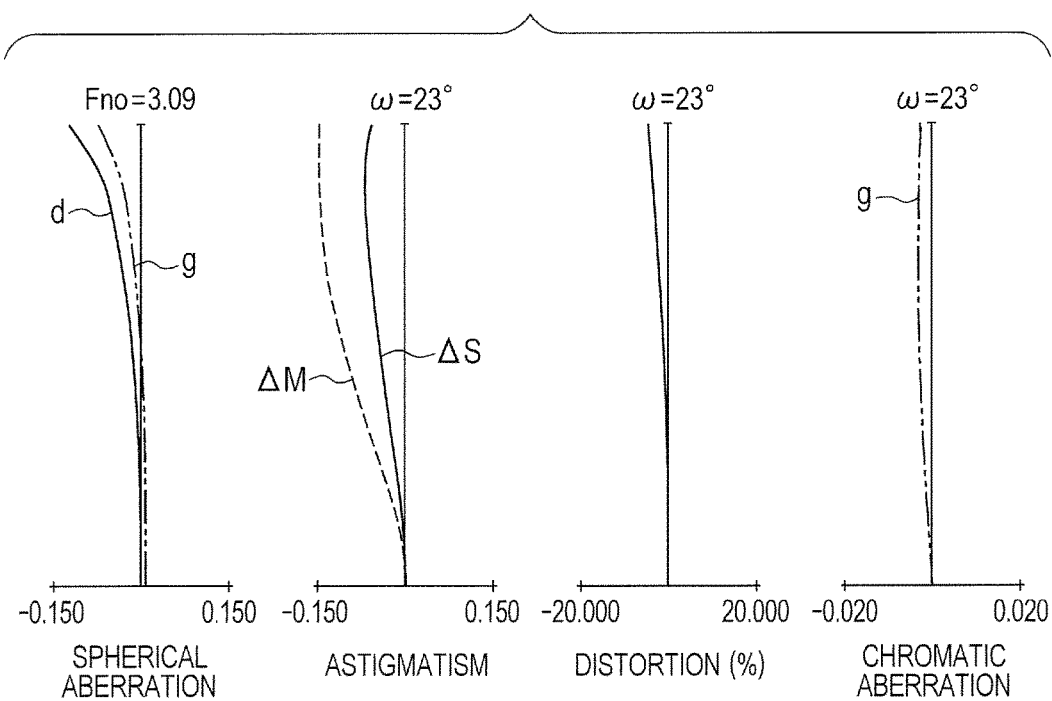
FIG. 6B is an aberration diagram of the zoom lens according to Example 2 when focusing on the object at the short distance at the intermediate zoom position.
Figure 6C:
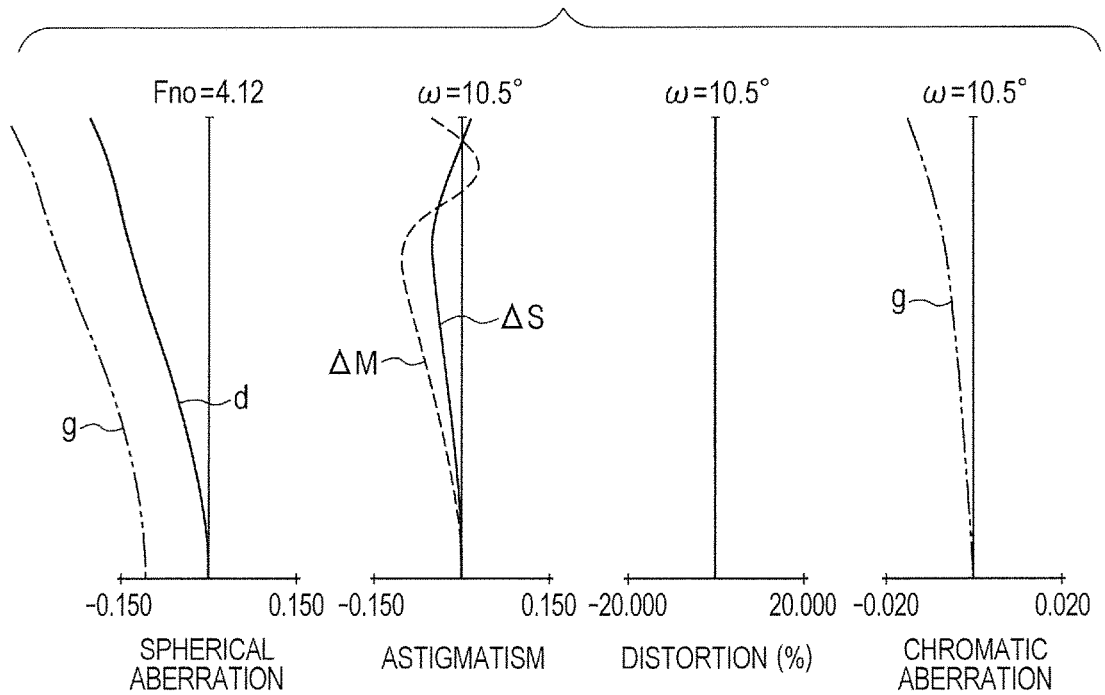
FIG. 6C is an aberration diagram of the zoom lens according to Example 2 when focusing on the object at the short distance at the telephoto end.

FIG. 4 is a lens cross-sectional view of Example 2 of the zoom lens according to the present invention when focusing on the object at infinity at the wide angle end. FIG. 5A, FIG. 5B, and FIG. 5C are longitudinal aberration diagrams of the zoom lens according to Example 2 when focusing on the object at infinity at the wide angle end, the intermediate zoom position, and the telephoto end, respectively. FIG. 6A, FIG. 6B, and FIG. 6C are longitudinal aberration diagrams of the zoom lens according to Example 2 when focusing on an object at a short distance at the wide angle end, the intermediate zoom position, and the telephoto end, respectively. The "object at a short distance" as used herein refers to an object at a position 50 millimeters (mm) toward the object side from the first lens surface at the wide angle end, 200 mm toward the object side from the first lens surface at the intermediate zoom position, and 200 mm toward the object side from the first lens surface at the telephoto end.

Figure 7:
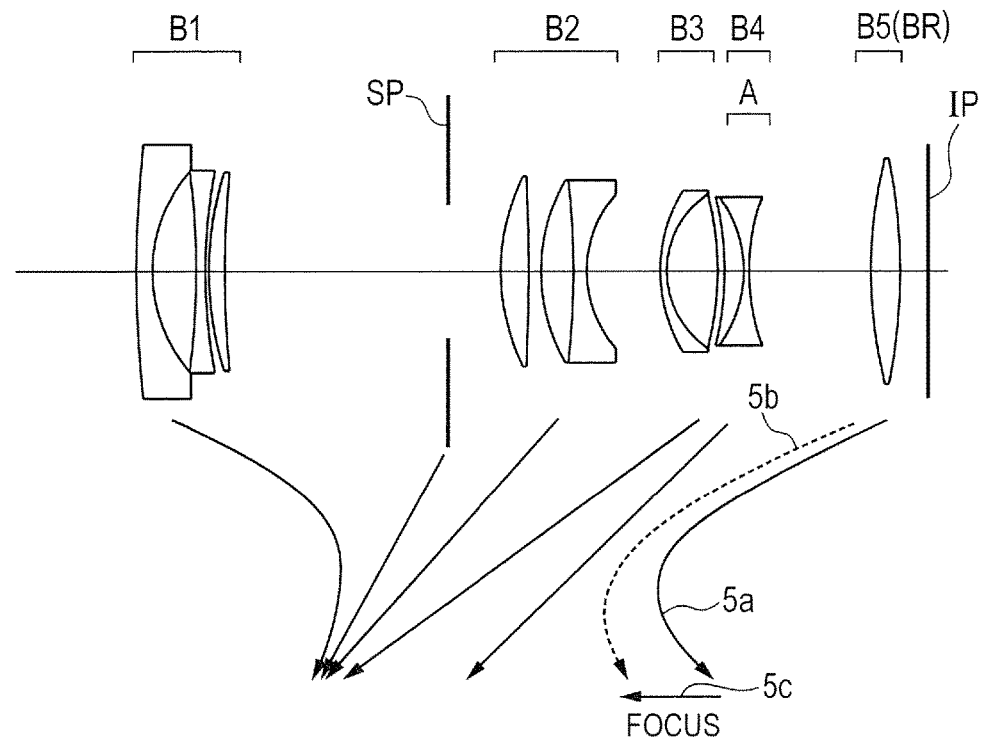
FIG. 7 is a lens cross-sectional view of a zoom lens according to Example 3 of the present invention when focusing on the object at infinity at the wide angle end.
Figure 8A:
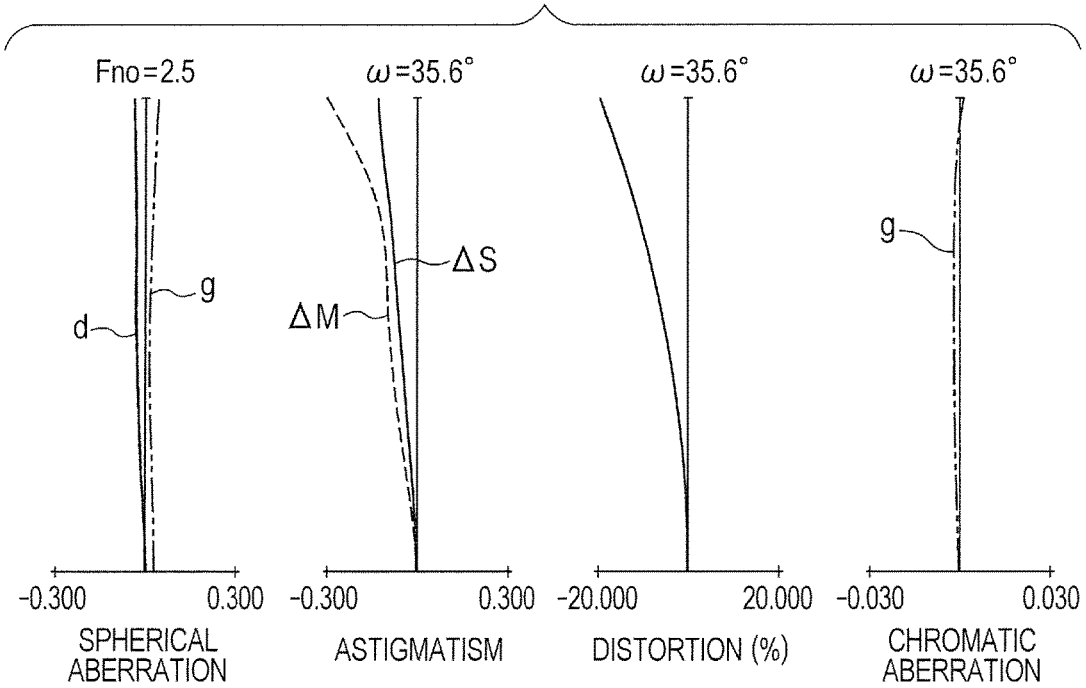
FIG. 8A is an aberration diagram of the zoom lens according to Example 3 when focusing on the object at infinity at the wide angle end.
Figure 8B:
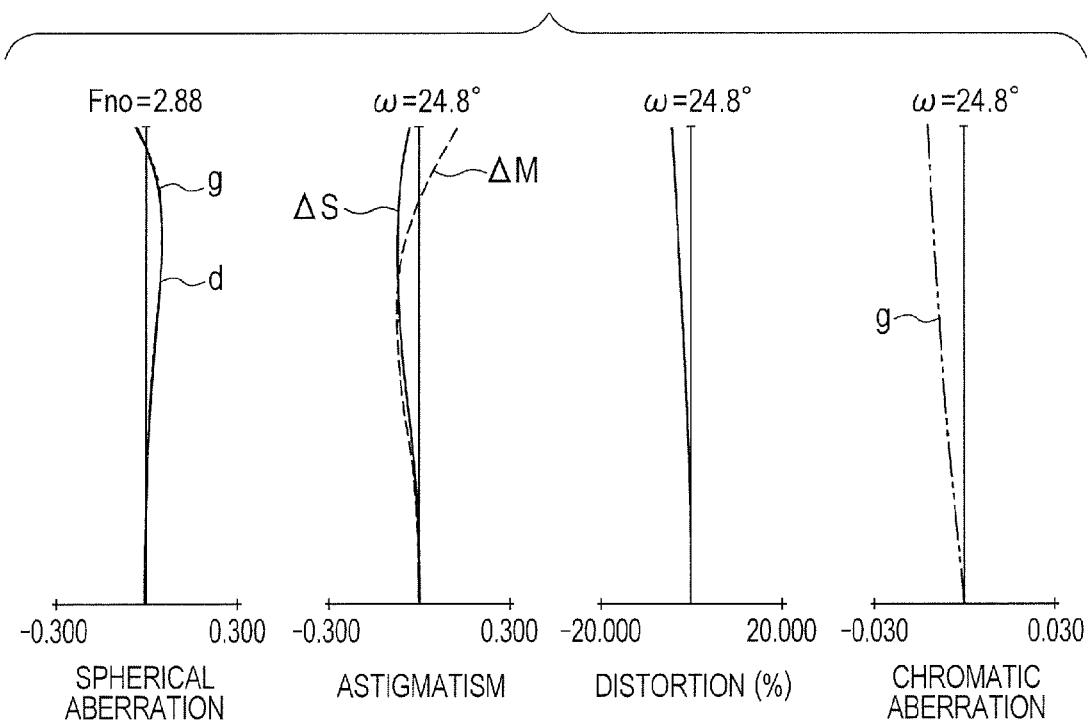
FIG. 8B is an aberration diagram of the zoom lens according to Example 3 when focusing on the object at infinity at the intermediate zoom position.
Figure 8C:
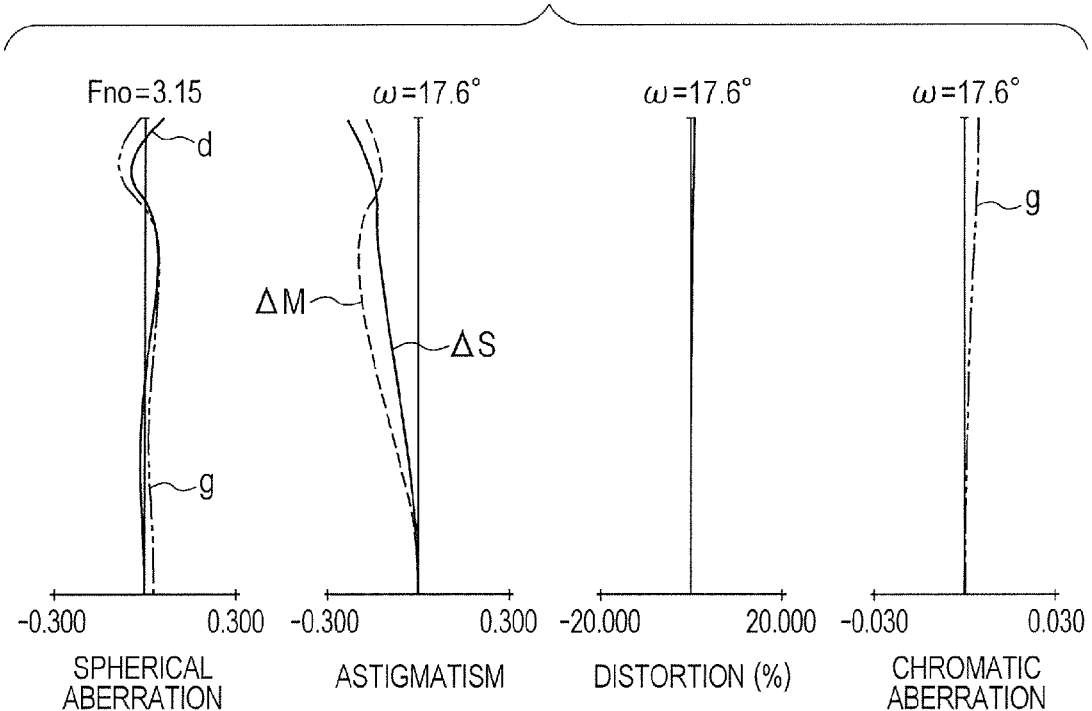
FIG. 8C is an aberration diagram of the zoom lens according to Example 3 when focusing on the object at infinity at the telephoto end.
Figure 9A:
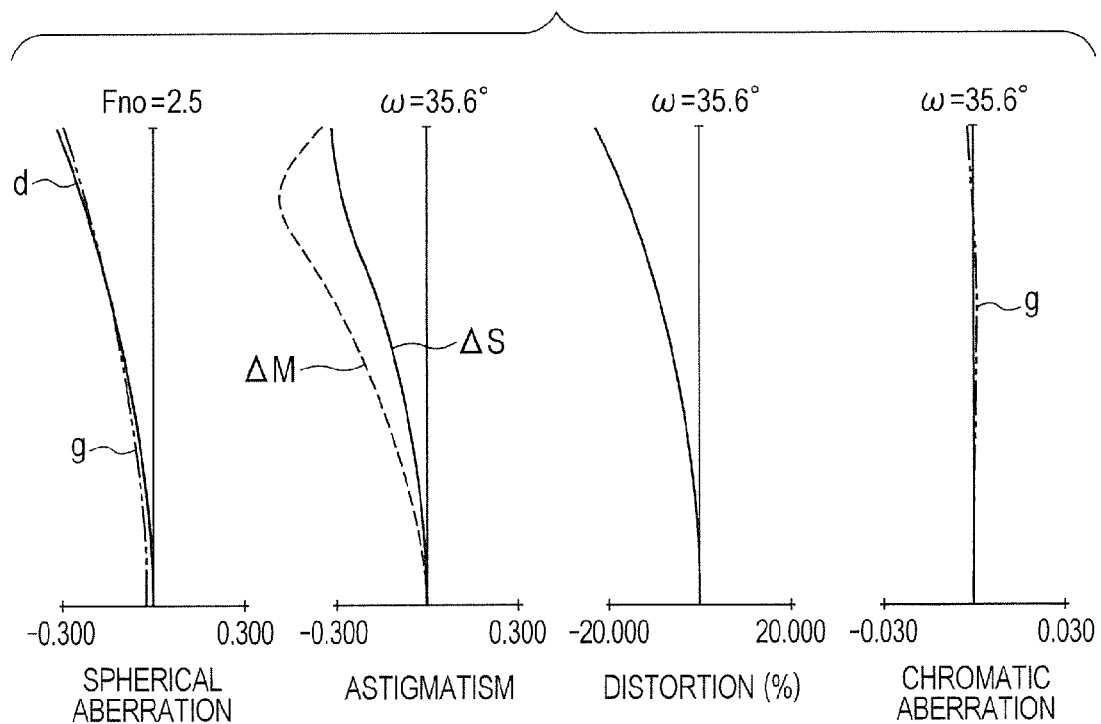
FIG. 9A is an aberration diagram of the zoom lens according to Example 3 when focusing on the object at the short distance at the wide angle end.
Figure 9B:
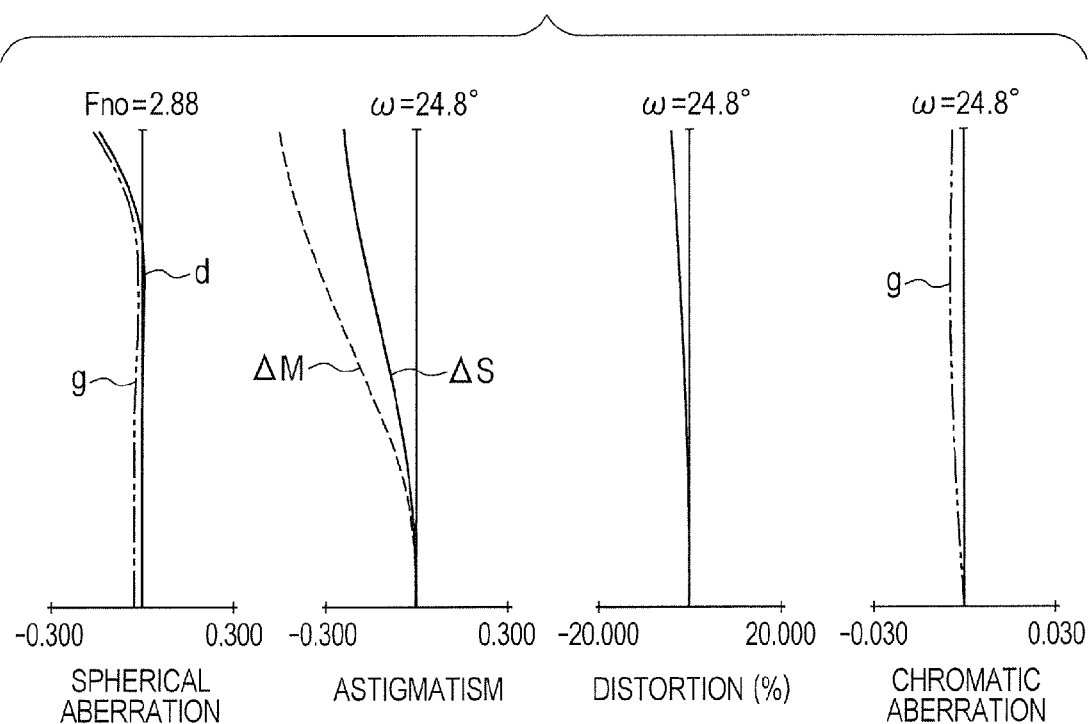
FIG. 9B is an aberration diagram of the zoom lens according to Example 3 when focusing on the object at the short distance at the intermediate zoom position.

FIG. 7 is a lens cross-sectional view of Example 3 of the zoom lens according to the present invention when focusing on the object at infinity at the wide angle end. FIG. 8A, FIG. 8B, and FIG. 8C are longitudinal aberration diagrams of the zoom lens according to Example 3 when focusing on the object at infinity at the wide angle end, the intermediate zoom position, and the telephoto end, respectively. FIG. 9A, FIG. 93, and FIG. 9C are longitudinal aberration diagrams of the zoom lens according to Example 3 when focusing on an object at a short distance at the wide angle end, the intermediate zoom position, and the telephoto end, respectively. The "object at a short distance" as used herein refers to an object at a position 50 millimeters (mm) toward the object side from the first lens surface at the wide angle end, 500 mm toward the object side from the first lens surface at the intermediate zoom position, and 500 mm toward the object side from the first lens surface at the telephoto end.

FIG. 10 is a lens cross-sectional view of Example 4 of the zoom lens according to the present invention when focusing on the object at infinity at the wide angle end.

Figure 11A:
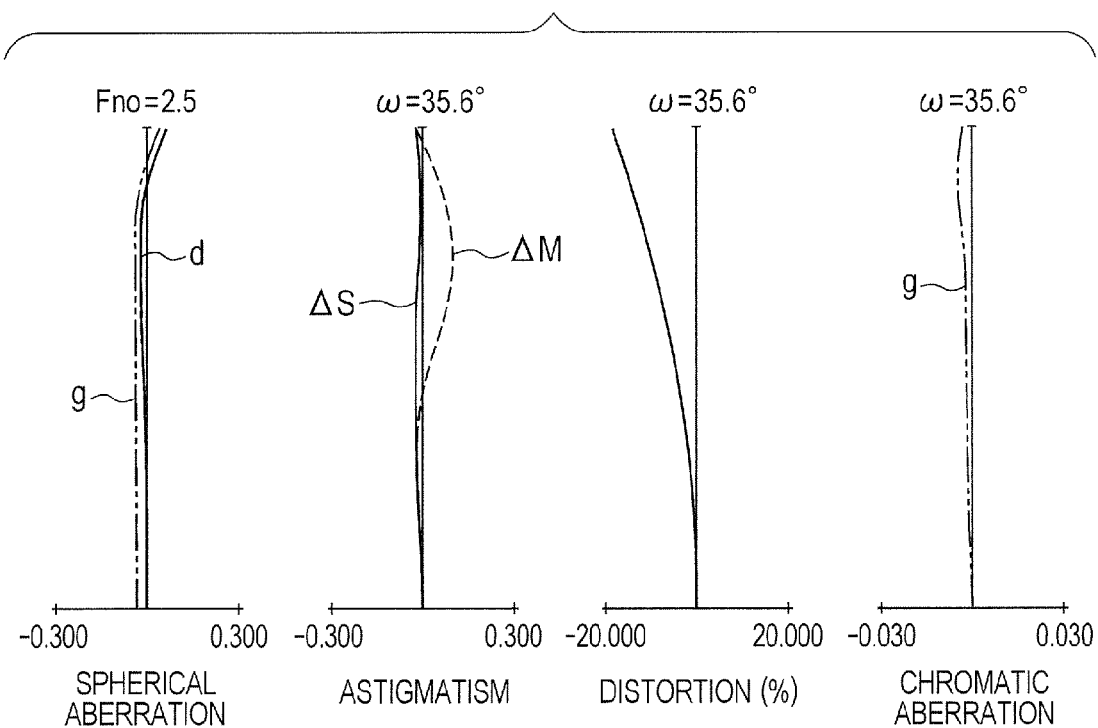
FIG. 11A is an aberration diagram of the zoom lens according to Example 4 when focusing on the object at infinity at the wide angle end.
Figure 11B:
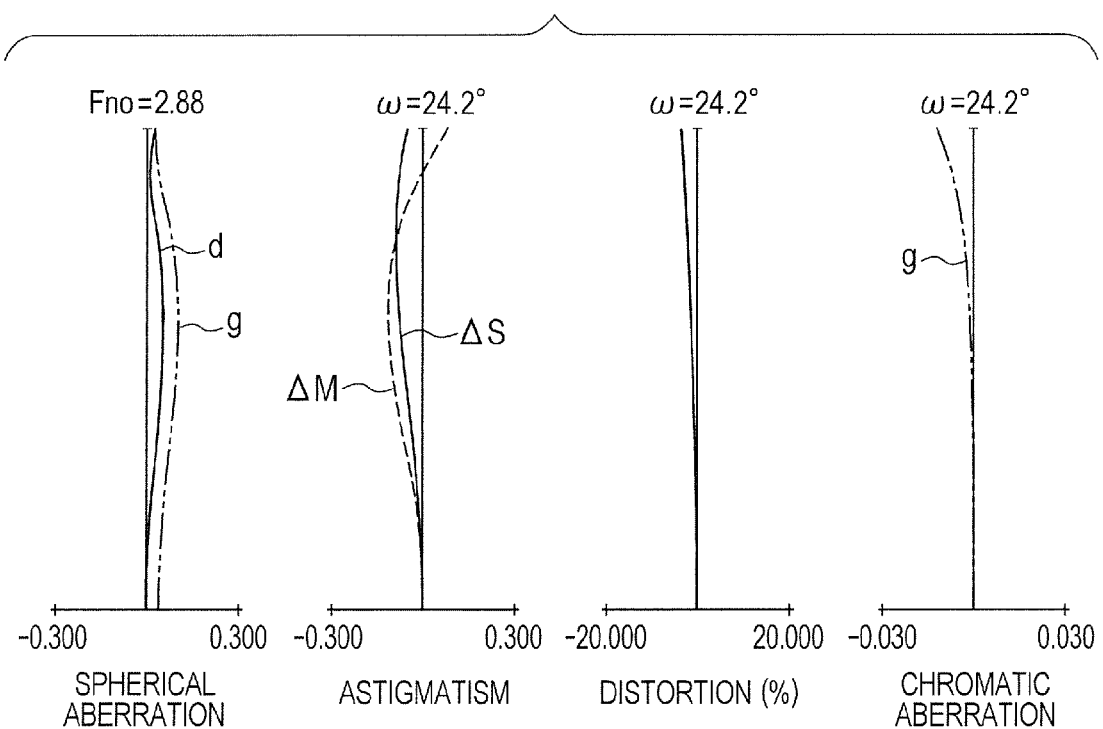
FIG. 11B is an aberration diagram of the zoom lens according to Example 4 when focusing on the object at infinity at the intermediate zoom position.
Figure 11C:
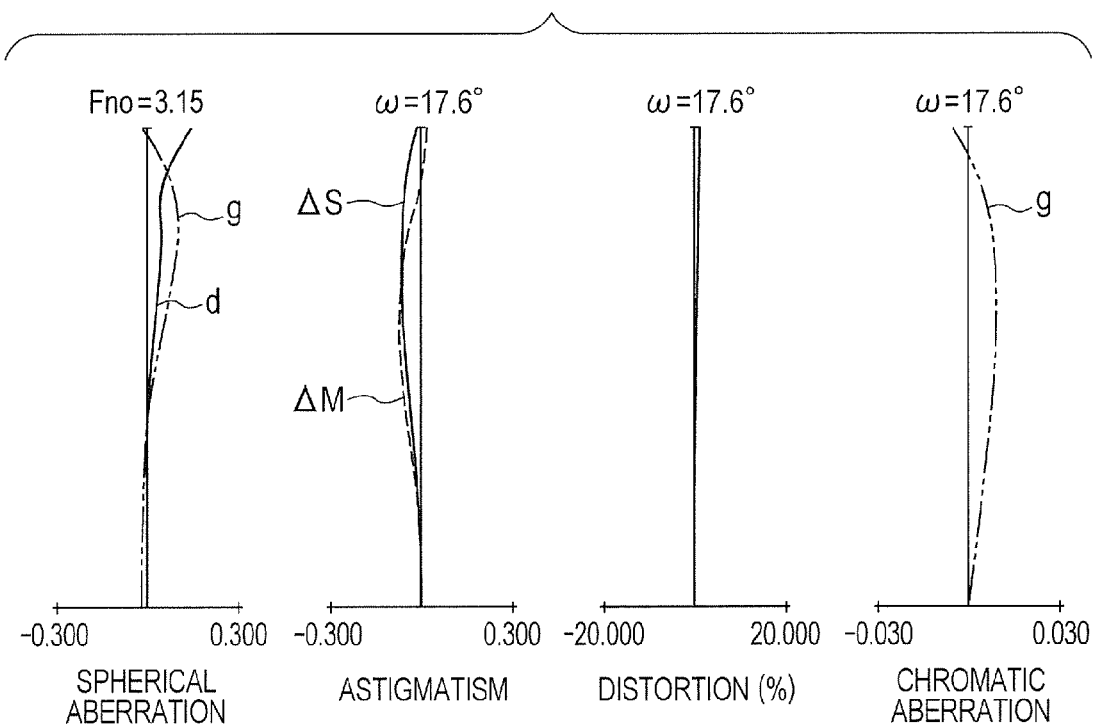
FIG. 11C is an aberration diagram of the zoom lens according to Example 4 when focusing on the object at infinity at the telephoto end.
Figure 12A:
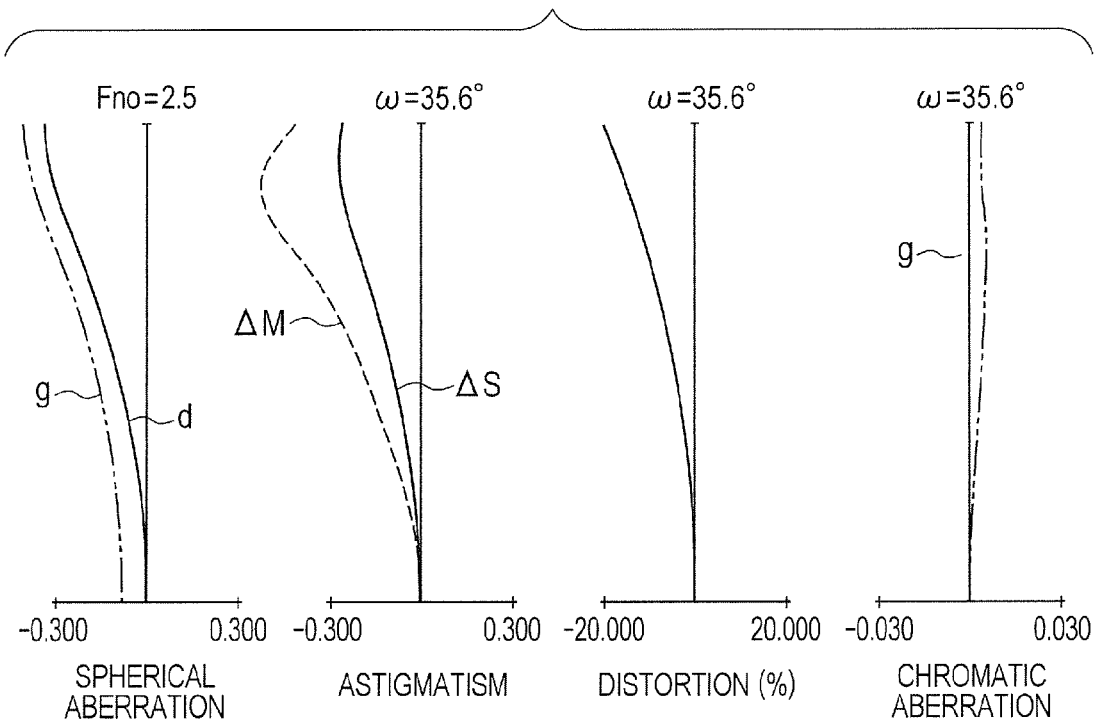
FIG. 12A is an aberration diagram of the zoom lens according to Example 4 when focusing on the object at the short distance at the wide angle end.
Figure 12B:
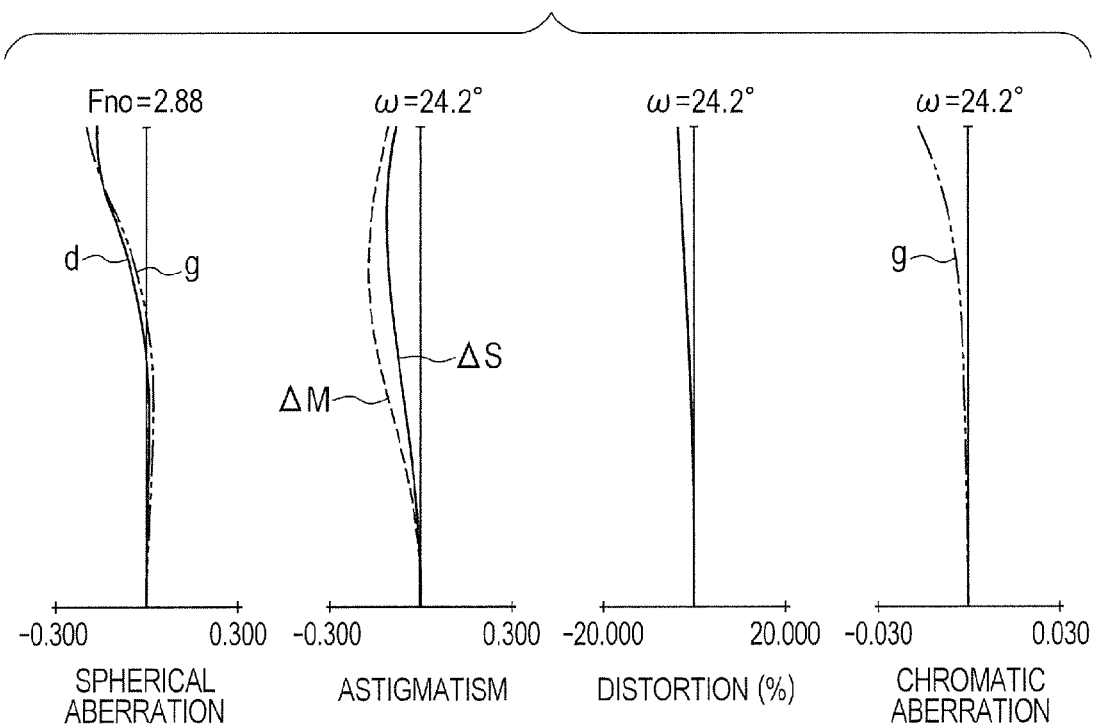
FIG. 12B is an aberration diagram of the zoom lens according to Example 4 when focusing on the object at the short distance at the intermediate zoom position.
Figure 12C:
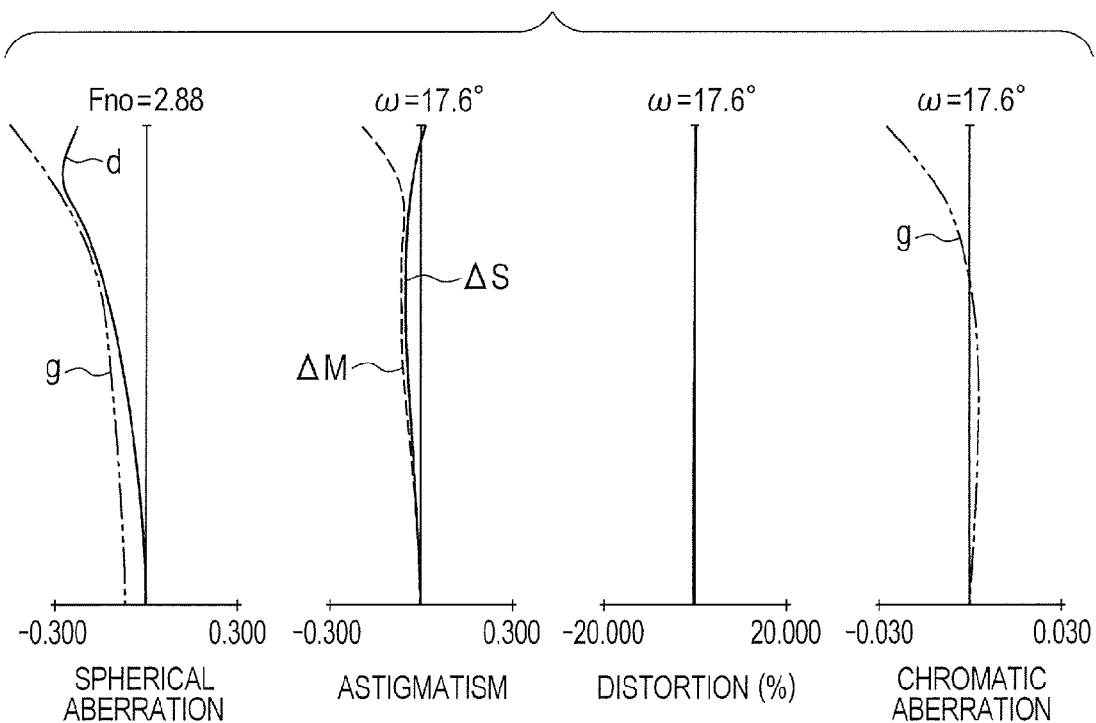
FIG. 12C is an aberration diagram of the zoom lens according to Example 4 when focusing on the object at the short distance at the telephoto end.

FIG. 11A, FIG. 11B, and FIG. 11C are longitudinal aberration diagrams of the zoom lens according to Example 4 when focusing on the object at infinity at the wide angle end, the intermediate zoom position, and the telephoto end, respectively. FIG. 12A, FIG. 12B, and FIG. 12C are longitudinal aberration diagrams of the zoom lens according to Example 4 when focusing on an object at a short distance at the wide angle end, the intermediate zoom position, and the telephoto end, respectively. The "object at a short distance" as used herein refers to an object at a position 50 millimeters (mm) toward the object side from the first lens surface at the wide angle end, 500 mm toward the object side from the first lens surface at the intermediate zoom position, and 500 mm toward the object side from the first lens surface at the telephoto end.

Figure 13:
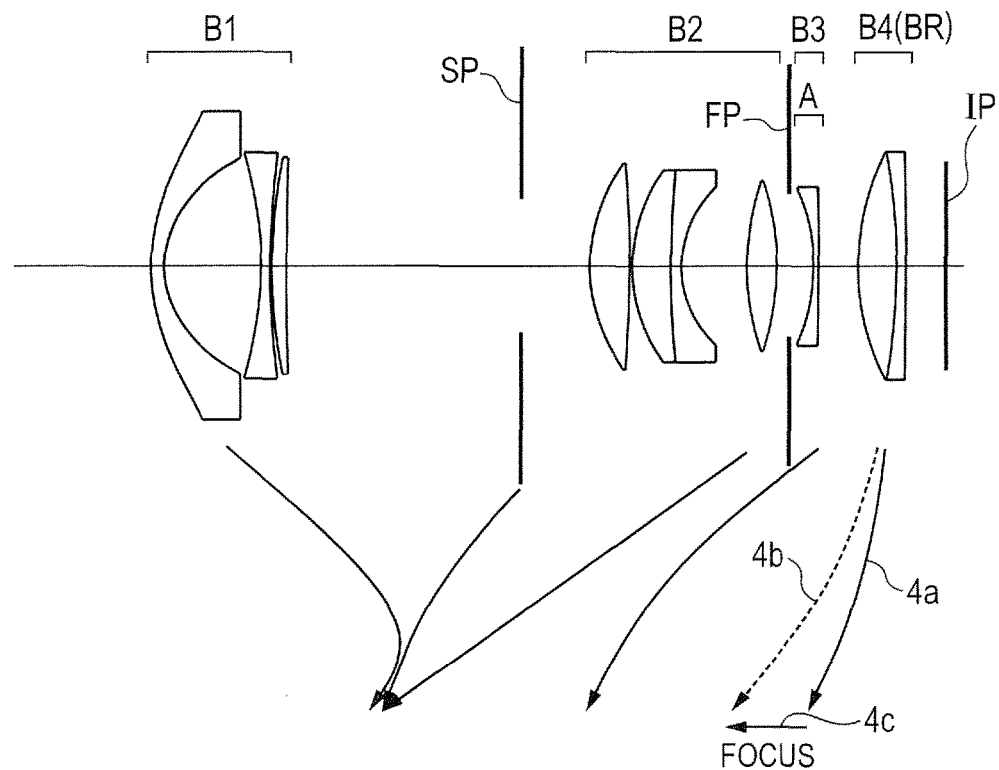
FIG. 13 is a lens cross-sectional view of a zoom lens according to Example 5 of the present invention when focusing on the object at infinity at the wide angle end.
Figure 14A:
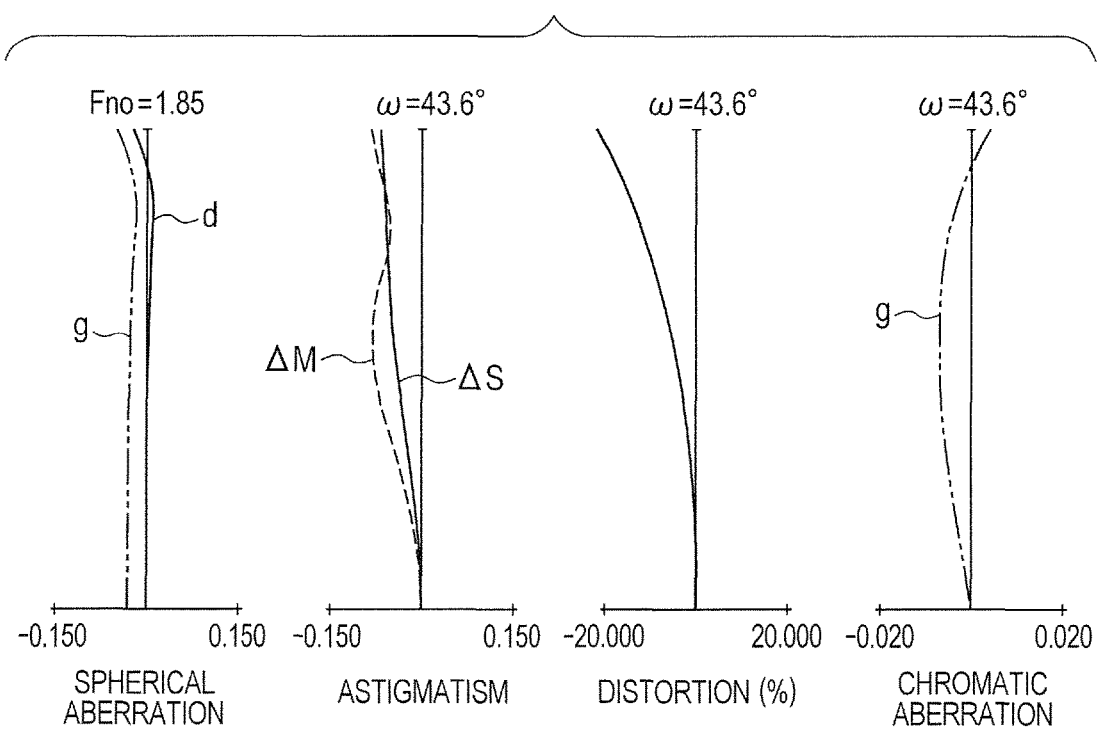
FIG. 14A is an aberration diagram of the zoom lens according to Example 5 when focusing on the object at infinity at the wide angle end.
Figure 14B:
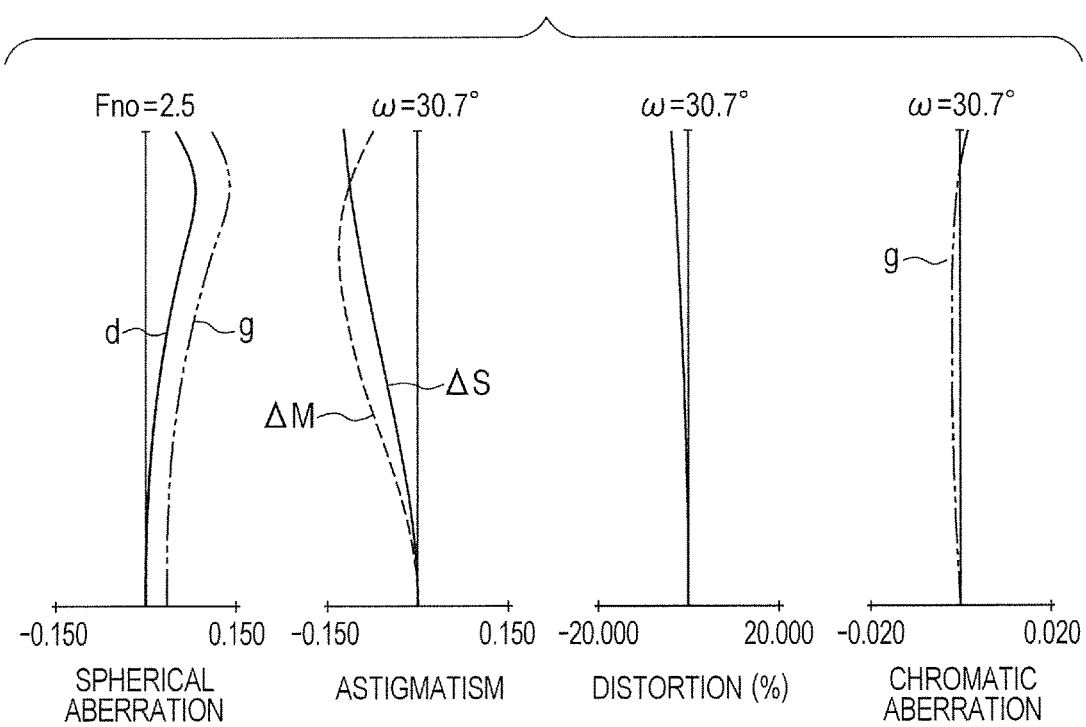
FIG. 14B is an aberration diagram of the zoom lens according to Example 5 when focusing on the object at infinity at the intermediate zoom position.
Figure 14C:
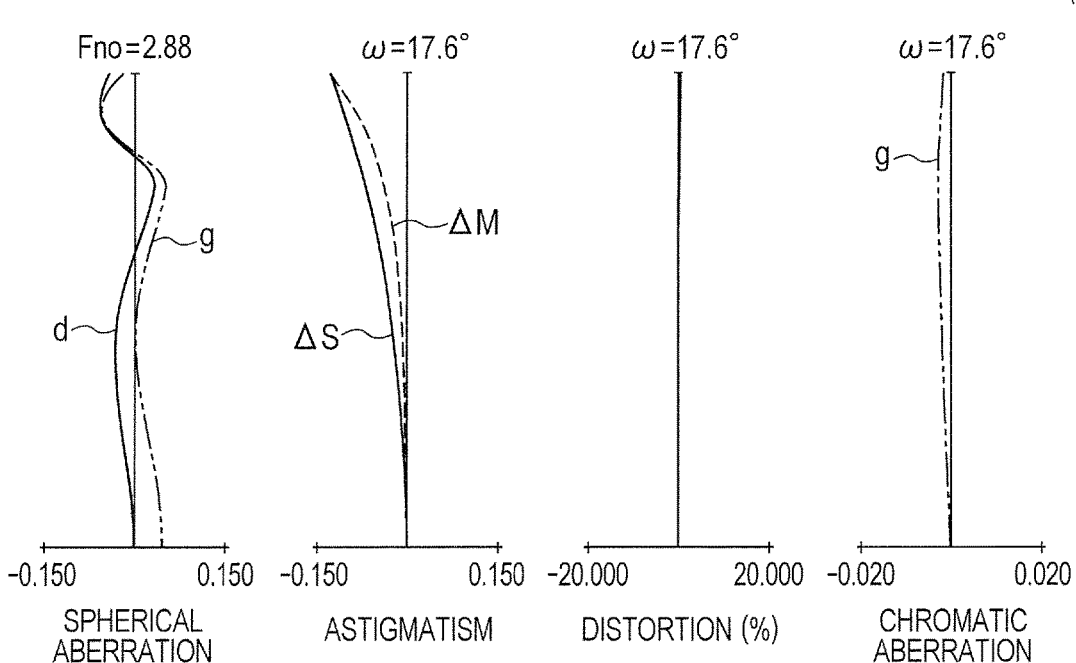
FIG. 14C is an aberration diagram of the zoom lens according to Example 5 when focusing on the object at infinity at the telephoto end.
Figure 15A:
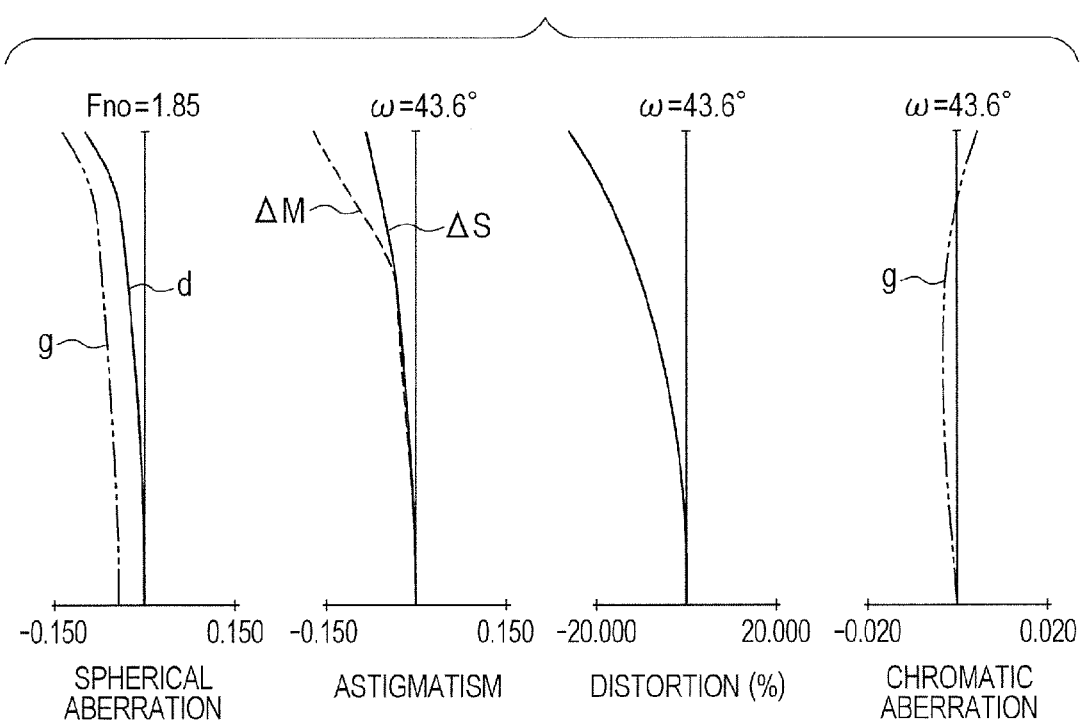
FIG. 15A is an aberration diagram of the zoom lens according to Example 5 when focusing on the object at the short distance at the wide angle end.
Figure 15B:
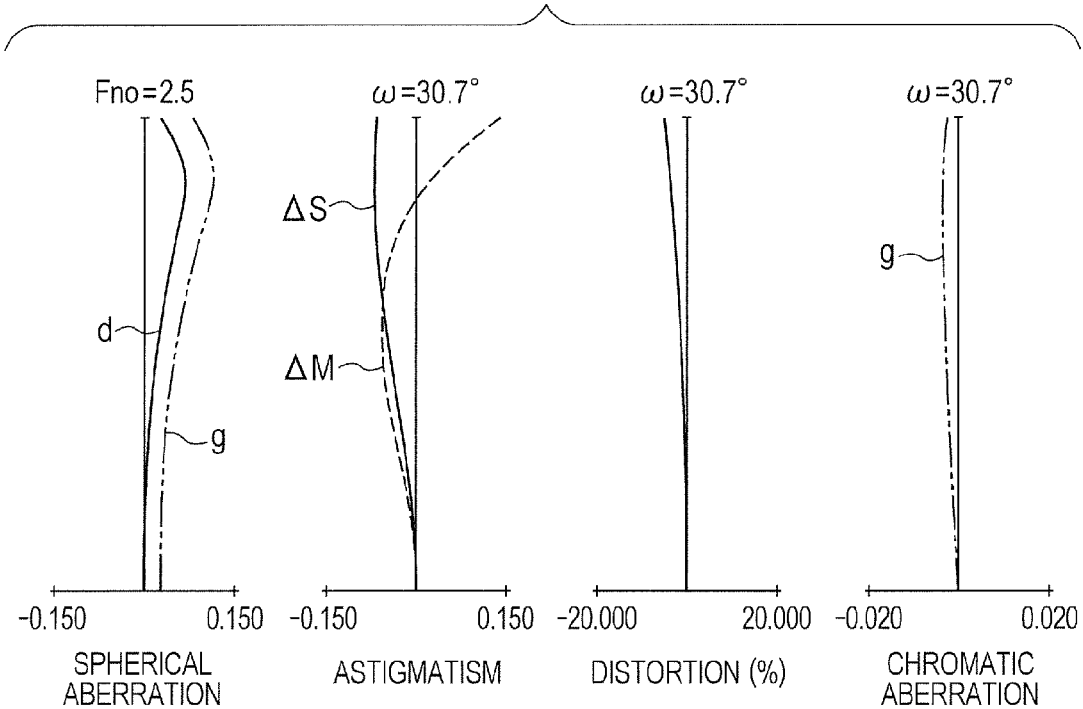
FIG. 15B is an aberration diagram of the zoom lens according to Example 5 when focusing on the object at the short distance at the intermediate zoom position.
Figure 15C:
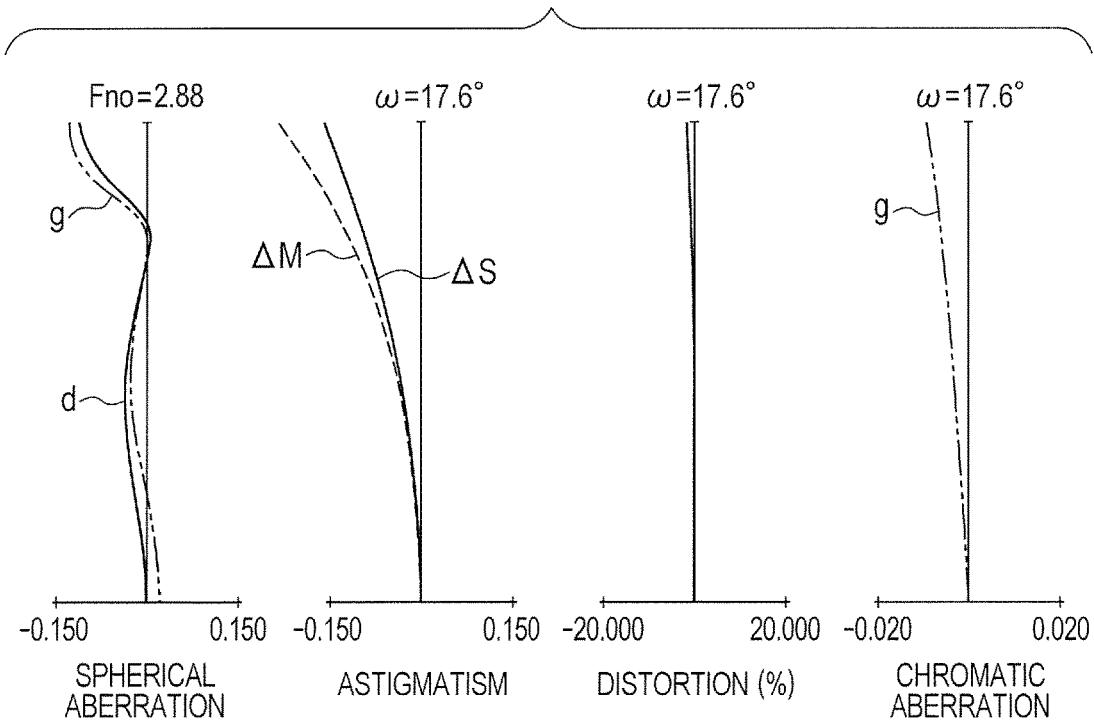
FIG. 15C is an aberration diagram of the zoom lens according to Example 5 when focusing on the object at the short distance at the telephoto end.
Figure 16:
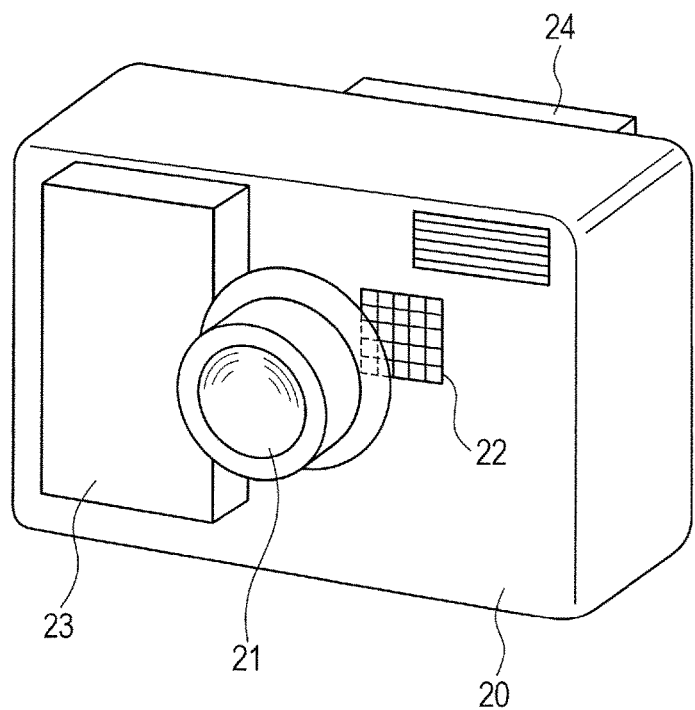
FIG. 16 is a schematic diagram of a main part of an image pickup apparatus of the present invention.

FIG. 13 is a lens cross-sectional view of Example 5 of the zoom lens according to the present invention when focusing on the object at infinity at the wide angle end. FIG. 14A, FIG. 14B, and FIG. 14C are longitudinal aberration diagrams of the zoom lens according to Example 5 when focusing on the object at infinity at the wide angle end, the intermediate zoom position, and the telephoto end, respectively. FIG. 15A, FIG. 15B, and FIG. 15C are longitudinal aberration diagrams of the zoom lens according to Example 5 when focusing on the object at a short distance at the wide angle end, the intermediate zoom position, and the telephoto end, respectively. The "object at a short distance" as used herein refers to an object at a position 50 millimeters (mm) toward the object side from the first lens surface at the wide angle end, 500 mm toward the object side from the first lens surface at the intermediate zoom position, and 500 mm toward the object side from the first lens surface at the telephoto end. FIG. 16 is a schematic diagram of a main part of an image pickup apparatus of the present invention.

The zoom lens in each of Examples is used with an image pickup apparatus such as a digital camera, a video camera, a television (TV) camera, a monitoring camera, or a film camera. The zoom lens in each of Examples is a positive lead type zoom lens including a lens unit having a positive refractive power closest to the object side, or a negative lead type zoom lens including a lens unit having a negative refractive power closest to the object side. Moreover, a focus lens unit has a positive refractive power or a negative refractive power.

In the lens cross-sectional view of the zoom lens in each of Examples, the left side is the object side (front side), and the right side is the image side (rear side). In the lens cross-sectional view, the order of the lens unit from the object side is represented by i, and the i-th lens unit is denoted by Bi. An aperture stop is denoted by SP. A flare cut stop is denoted by FP. An image plane is denoted by IP. The image plane IP corresponds to an image plane of a solid-state image pickup element (photo-electric conversion element) such as a complementary metal oxide semiconductor (CMOS) sensor in a case where the zoom lens is used as a photographing optical system of a digital camera or a video camera, and to a film surface in a case where the zoom lens is used as an image pickup optical system of a silver-halide film camera. The arrows indicate movement loci of the lens units during zooming from the wide angle end to the telephoto end. The arrow regarding focus indicates a movement direction of the lens unit during focusing from infinity to proximity.

In the aberration diagrams in each of Examples, the solid line d and the two-dot chain line g in spherical aberration indicate a d-line and a g-line, respectively, the dotted line (ΔM) and the solid line (ΔS) in astigmatism indicate a meridional image plane and a sagittal image plane, respectively, and the two-dot chain line in lateral chromatic aberration indicates the g-line. A half angle of view (photographing half angle of view) is represented by ω, and an f-number is represented by Fno. Note that, the wide angle end and the telephoto end in each of Examples to be described below represent zoom positions when a magnification-varying lens unit is positioned at one end and the other end of a range in which the magnification-varying lens unit is mechanically movable on an optical axis, respectively.

The zoom lens in each of Examples includes a plurality of lens units, and an interval between each pair of adjacent lens units is changed during zooming. A lens unit (last lens unit) BR located closest to the image side is a focus lens unit configured to move in the optical axis direction to perform focusing. A lens element A adjacent to the focus lens unit BR on the object side consists of a single lens or a cemented lens. A sign of a refractive power of the lens element A is opposite to a sign of a refractive power of the focus lens unit BR.

A configuration in which the lens element A and the focus lens unit BR have refractive powers of opposite signs is adopted to reduce the refractive powers of both the lens element A and the focus lens unit BR. An angle of incidence α of an on-axis marginal ray and an angle of incidence $\bar{\alpha}$ of an off-axis principal ray on the focus lens unit BR at the wide angle end are increased. In this manner, an amount of variation in field curvature during the movement of the focus lens unit:

$$(\Delta III)_2 \propto (1/f)\alpha_2 \bar{\alpha}_2 \bar{h}_2 (\Delta h_2) \quad (X1)$$

is increased in the rear focus type zoom lens. As a result, a variation in field curvature during the movement of the object distance is corrected during the movement of the focus lens unit at the wide angle end. Note that, in Expression (X1), f represents a focal length of the focus lens unit. $\alpha_2$, $\bar{\alpha}_2$, $\bar{h}_2$ represent the angle of incidence of the on-axis marginal ray, the angle of incidence of the off-axis principal ray, and a height of incidence of the off-axis principal ray on the focus lens unit before the movement of the focus lens unit, respectively. ($\Delta h_2$) represents a variation amount of a height of incidence of the on-axis marginal ray on the focus lens unit, which is caused by the movement of the focus lens unit.

In addition, in the zoom lens according to the present invention, the lens element A adjacent to the focus lens unit BR on the object side consists of a single lens or a cemented lens. A distance between a surface closest to the image side of the lens element A and the image plane at the wide angle end is represented by di. A distance between the surface closest to the image side of the lens element A and a surface closest to the object side of the focus lens unit BR at the wide angle end is represented by df. A focal length of the zoom lens at the wide angle end is represented by fw. The following conditional expressions are satisfied:

$$0.2 < di/fw < 1.4 \quad (1); \text{ and}$$

$$0.2 < df/fw < 1.2 \quad (2).$$

The conditional expression (1) appropriately defines, in order to reduce a variation in spherical aberration and the variation in field curvature during focusing at the wide angle end, the focal length fw of the entire system at the wide angle end and the distance between the surface closest to the image side of the lens element A and the image plane at the wide angle end. When the ratio exceeds the upper limit value of the conditional expression (1), and the lens element A becomes far away from the image plane, an exit angle of the on-axis marginal ray at the lens element A becomes small, and an angle of incidence of the on-axis marginal ray on the focus lens unit also becomes small. Then, the variation amount of the height of incidence of the on-axis marginal ray on the focus lens unit during focusing is reduced, and it becomes difficult to cancel the variation in field curvature.

When the ratio falls below the lower limit value of the conditional expression (1), and the lens element A becomes close to the image plane, it becomes difficult to provide a sufficiently large amount of movement of the focus lens unit BR during focusing, and hence to perform focusing in a wide range of object distance.

The conditional expression (2) is intended to reduce the variation in spherical aberration and the variation in field curvature during focusing at the wide angle end. The conditional expression (2) appropriately defines the focal length fw of the entire system at the wide angle end and the distance between the surface closest to the image side of the lens element A and the surface closest to the object side of the focus lens unit BR at the wide angle end.

When the ratio exceeds the upper limit value of the conditional expression (2), and the lens element A becomes far away from the focus lens unit BR, the lens element A also becomes far away from the image plane, and the exit angle of the on-axis marginal ray at the lens element A becomes small. Further, the angle of incidence α of the on-axis marginal ray on the focus lens unit BR also becomes small. Then, the variation amount of the height of incidence of the on-axis marginal ray on the focus lens unit BR during focusing is reduced, and it becomes difficult to reduce the variation in field curvature.

When the ratio falls below the lower limit value of the conditional expression (2), and the lens element A becomes close to the focus lens unit BR, it becomes difficult to provide the sufficiently large amount of movement of the focus lens unit BR during focusing, and hence to perform focusing in the wide range of object distance. In addition, the height of incidence of the on-axis marginal ray on the focus lens unit BR is not sufficiently small, and hence it becomes difficult to reduce the variation in spherical aberration during focusing.

In the present invention, it is more preferred to satisfy at least one of the conditional expressions provided below.

When the focus lens unit BR has a positive refractive power, it is preferred to satisfy at least one of the conditional expressions provided below. A lateral magnification of the focus lens unit BR at the wide angle end is represented by βw. The focus lens unit BR consists of a single lens having a positive refractive power or a cemented lens having a positive refractive power, and curvature radii of the surface closest to the object side and a surface closest to the image side of the focus lens unit BR are represented by rf and rr, respectively. A focal length of the lens element A is represented by fa. At this time, it is preferred to satisfy at least one of the following conditional expressions.

$$0.7 < \beta w < 1.0 \quad (3P)$$

$$-5.0 < (rf+rr)/(rf-rr) < 0.0 \quad (4P); \text{ and}$$

$$1.0 < -fa/fw < 4.0 \quad (5P).$$

Next, technical meanings of the above-mentioned conditional expressions are described. The conditional expression (3P) defines the lateral magnification βw of the focus lens unit BR at the wide angle end when the focus lens unit BR has a positive refractive power.

The conditional expression (3P) is intended to reduce the variation in spherical aberration and the variation in field curvature during focusing at the wide angle end. The lateral magnification of the focus lens unit BR is set to a value close to 1.0 to reduce focus sensitivity $(1-\beta w^2)$. In this manner, a variation in height of incidence of the on-axis marginal ray on the lens unit BR is increased, and hence it becomes easy to correct the variation in field curvature. The lateral magnification of the lens unit BR during focusing never exceeds the upper limit value of the conditional expression (3P) to become 1.

When the lateral magnification falls below the lower limit value of the conditional expression (3P), the focus sensitivity becomes too high, and the variation in height of incidence of the on-axis marginal ray on the focus lens unit BR becomes small, with the result that it becomes difficult to reduce the variation in field curvature.

The conditional expression (4P) defines, in order to reduce the variation in field curvature and the variation in spherical aberration during focusing at the wide angle end, a shape factor (lens shape) of the focus lens unit BR. The conditional expression (4P) is intended so that the off-axis principal ray enters a refractive surface obliquely in order to reduce the variation in field curvature, and so that the on-axis marginal ray enters the refractive surface nearly perpendicularly in order to reduce the variation in spherical aberration.

When the ratio exceeds the upper limit value of the conditional expression (4P), and values of the curvature radii of the surface on the object side and the surface on the image side become close to each other, it becomes difficult to reduce the variation in field curvature and to reduce the variation in spherical aberration. When the ratio falls below the lower limit value of the conditional expression (4P), and the shape factor becomes close to a meniscus shape that is convex on the object side, in which the surface on the object side has a strong curvature, it becomes difficult to reduce the variation in field curvature.

The conditional expression (5P) defines the refractive power of the lens element A arranged close to the image plane and the focus lens unit BR to reduce the variation in spherical aberration and the variation in field curvature during focusing at the wide angle end.

When the ratio exceeds the upper limit value of the conditional expression (5P), and an absolute value of the focal length of the lens element A becomes large, that is, an absolute value of the refractive power becomes small, in a case where the aperture stop SP is arranged on the object side of the lens element A, an exit angle of the off-axis principal ray at the lens element A becomes small. Then, the angle of incidence of the off-axis principal ray on the focus lens unit BR becomes small, and it becomes difficult to reduce the variation in field curvature. In a case where the aperture stop SP is arranged on the image side of the lens element A, a ratio of the height of incidence of the on-axis marginal ray to the height of incidence of the off-axis principal ray on the focus lens unit BR becomes large, and hence it becomes difficult to reduce the variation in spherical aberration.

When the ratio falls below the lower limit value of the conditional expression (5P), and the absolute value of the focal length of the lens element A becomes small, that is, the absolute value of the refractive power becomes large, in the case where the aperture stop SP is arranged on the object side of the lens element A, the height of incidence of the on-axis marginal ray on the lens element A is not sufficiently small. Then, the height of incidence of the on-axis marginal ray on the focus lens unit BR also becomes large, and hence it becomes difficult to reduce the variation in spherical aberration. On the other hand, in the case where the aperture stop SP is arranged on the image side of the lens element A, the ratio of the height of incidence of the on-axis marginal ray to the height of incidence of the off-axis principal ray on the focus lens unit BR becomes large, and hence it becomes difficult to reduce the variation in spherical aberration.

When the focus lens unit BR has a negative refractive power, it is preferred to satisfy at least one of the conditional expressions provided below. A lateral magnification of the focus lens unit BR at the wide angle end is represented by $\beta w$. The focus lens unit BR consists of a single lens having a negative refractive power or a cemented lens having a negative refractive power, and curvature radii of the surface closest to the object side and the surface closest to the image side of the focus lens unit BR are represented by rf and rr, respectively. A focal length of the lens element A is represented by fa. At this time, it is preferred to satisfy at least one of the following conditional expressions:

$$1.0<\beta w<1.3 \quad (3N)$$

$$0.0<(rf+rr)/(rf-rr)<5.0 \quad (4N); \text{ and}$$

$$1.0<fa/fw<4.0 \quad (5N).$$

Next, technical meanings of the above-mentioned conditional expressions are described. The conditional expression (3N) defines the lateral magnification $\beta w$ of the lens unit BR at the wide angle end when the focus lens unit BR has a negative refractive power. The conditional expression (3N) is intended to reduce the variation in spherical aberration and the variation in field curvature during focusing at the wide angle end. The lateral magnification of the focus lens unit BR is set to a value close to 1.0 to reduce focus sensitivity $(1-\beta w^2)$. In this manner, a variation in height of incidence of the on-axis marginal ray on the focus lens unit BR is increased, and hence it becomes easy to correct the variation in field curvature.

When the lateral magnification exceeds the upper limit value of the conditional expression (3N), the focus sensitivity becomes too high, and the variation in height of incidence of the on-axis marginal ray on the focus lens unit BR becomes small, with the result that it becomes difficult to reduce the variation in field curvature. The lateral magnification during focusing never falls below the lower limit value of the conditional expression (3N) to become 1.

The conditional expression (4N) defines, in order to reduce the variation in field curvature and the variation in spherical aberration during focusing at the wide angle end, the shape factor of the focus lens unit BR. The conditional expression (4N) is intended so that the off-axis principal ray enters the refractive surface obliquely in order to reduce the variation in field curvature, and so that the on-axis marginal ray enters the refractive surface nearly perpendicularly in order to reduce the variation in spherical aberration.

When the ratio exceeds the upper limit value of the conditional expression (4N), and the shape factor becomes close to a meniscus shape that is convex on the object side, in which the surface on the object side has a strong curvature, it becomes difficult to reduce the variation in field curvature. When the ratio falls below the lower limit value of the conditional expression (4N), and values of the curvature radii of the surface on the object side and the surface on the image side become close to each other, it becomes difficult to reduce the variation in field curvature and to reduce the variation in spherical aberration.

The conditional expression (5N) defines the focal length fa of the lens element A when the focus lens unit BR has a negative refractive power. The above-mentioned conditional expression (5P) defines the same when the focus lens unit BR has a positive refractive power. Technical details of the conditional expression (5N) are the same as those of the conditional expression (5P).

It is preferred that the zoom lens in each of Examples include an aperture stop SP, which determines an open f-number light beam regardless of whether the lens unit BR has a positive refractive power or a negative refractive power. Moreover, an optically effective diameter of the surface closest to the image side of the lens element A is represented by φa. At this time, it is preferred to satisfy the following conditional expression:

$$0.7<\phi a/di<0.4 \quad (6).$$

The conditional expression (6) appropriately defines the optically effective diameter of the surface closest to the image side of the lens element A with respect to the distance between the surface closest to the image side of the lens element A and the image plane at the wide angle end to reduce the variation in field curvature at the wide angle end. The conditional expression (6) is intended, for the purpose of reducing the variation in field curvature, to increase the angle of incidence of the on-axis marginal ray on the focus lens unit BR, and hence to increase a variation amount of the height of incidence of the on-axis marginal ray on the focus lens unit BR.

When the ratio exceeds the upper limit value of the conditional expression (6), and the optically effective diameter of the surface closest to the image side of the lens element A becomes too large, an optically effective diameter of the focus lens unit BR also becomes large, and hence it becomes difficult to downsize the entire system of the zoom lens. Moreover, the optically effective diameter of the focus lens unit BR also becomes large at the telephoto end, and the height of incidence of the off-axis principal ray on the focus lens unit BR becomes large, with the result that it becomes difficult to reduce the variation in field curvature at the telephoto end.

When the ratio falls below the lower limit value of the conditional expression (6), and the optically effective diameter of the surface closest to the image side of the lens element A becomes too small, the angle of incidence of the on-axis marginal ray on the focus lens unit BR becomes small, and hence the variation amount of the height of incidence of the on-axis marginal ray becomes disadvantageously small. As a result, it becomes difficult to reduce the variation in field curvature.

When the zoom lens according to the present invention is applied to an image pickup apparatus including an image pickup element, a half angle of view of a photographing angle of view, which is defined by an effective range of the image pickup element, is represented by ωw. At this time, it is preferred to use a zoom lens having a wide angle of view that satisfies the following conditional expression:

$$\omega w \geq 30°.$$

Also at this time, when an amount of distortion at the half angle of view ωw of the zoom lens at the wide angle end is represented by d (%), it is desired to satisfy the following conditional expression:

$$d\ (\%)<-10\% \quad (7).$$

The conditional expression (7) is based on the precondition that, when the zoom lens according to the present invention performs focusing at the wide angle end, the variation in field curvature is disadvantageously increased in principle by the movement of the object distance. When the distortion at the wide angle end is small to exceed the upper limit value of the conditional expression (7), the variation in field curvature is not increased by the movement of the object distance. Therefore, there is no need to reduce the variation in field curvature during the movement of the lens unit BR for focusing, and the variation in field curvature is overcorrected, with the result that it becomes difficult to reduce the variation in field curvature.

Note that, it is further preferred to set the numerical value ranges of the conditional expressions (1), (2), (3P), (4P), (5P), (3N), (4N), (5N), (6), and (7) as follows.

$$1.0<di/fw<1.4 \quad (1a)$$

$$0.2<df/fw<1.0 \quad (2a)$$

$$0.8<\beta w<1.0 \quad (3Pa)$$

$$-1.0<(rf+rr)/(rf-rr)<0.0 \quad (4Pa)$$

$$1.0<-fa/fw<3.5 \quad (5Pa)$$

$$1.2<\beta w<1.3 \quad (3Na)$$

$$0.0<(rf+rr)/(rf-rr)<1.0 \quad (4Na)$$

$$1.0<fa/fw<3.5 \quad (5Na)$$

$$0.70<\phi a/di<1.35 \quad (6a); \text{ and}$$

$$-25\%<d<-15\% \quad (7a).$$

Now, a lens configuration of the zoom lens in each of Examples is described. The zoom lens in Example 1 consists, in order from an object side to an image side, of a first lens unit B1 having a positive refractive power, a second lens unit B2 having a negative refractive power, a third lens unit B3 having a positive refractive power, a fourth lens unit B4 having a positive refractive power, a fifth lens unit B5 having a negative refractive power, and a sixth lens unit B6 having a positive refractive power. The sixth lens unit B6 is the lens unit BR located closest to the image side, and the fifth lens unit B5 corresponds to the lens element A.

During zooming from the wide angle end to the telephoto end, a change in interval between each pair of adjacent lens units is as follows. An interval between the first lens unit B1 and the second lens unit B2 is increased, an interval between the second lens unit B2 and the third lens unit B3 is decreased, an interval between the third lens unit B3 and the fourth lens unit B4 is decreased, and an interval between the fourth lens unit B4 and the fifth lens unit B5 is increased. An interval between the fifth lens unit B5 and the sixth lens unit B6 is increased. The lens units are configured to move along mutually different loci during zooming. Moreover, a rear focus system in which the sixth lens unit B6 is moved on the optical axis to perform focusing is adopted.

In a case where focusing is performed from infinity to a short distance at the telephoto end, the focusing is performed by extending the sixth lens unit B6 toward the front side as indicated by the arrow 6c. The solid curve 6a and the dotted curve 6b regarding the sixth lens unit B6 are movement loci for correcting an image plane variation accompanying zooming when focusing at infinity and the short distance, respectively.

The first lens unit B1 consists, in order from the object side to the image side, of a positive cemented lens formed by cementing a negative lens and a positive lens to realize a high zoom ratio and make the entire system compact (downsized) by means of the positive lead. The second lens unit B2 consists, in order from the object side to the image side, of a negative lens, a negative lens, and a positive lens to realize the wide angle of view, and to generate large distortion in a wide angle range. The third lens unit B3 consists, in order from the object side to the image side, of a positive lens, and a negative cemented lens formed by cementing a positive lens and a negative lens to suppress the variation in spherical aberration over the entire zoom range. The fourth lens unit B4 consists of one positive lens, the fifth lens unit B5 consists of one negative lens, and the sixth lens unit B6 consists of one positive lens to make the entire system compact.

The zoom lens in Example 2 consists, in order from an object side to an image side, of a first lens unit B1 having a positive refractive power, a second lens unit B2 having a negative refractive power, a third lens unit B3 having a positive refractive power, a fourth lens unit B4 having a negative refractive power, and a fifth lens unit B5 having a negative refractive power. Moreover, a rear focus system in which the fifth lens unit B5 is moved on the optical axis to perform focusing is adopted. In a case where focusing is performed from the object at infinity to the object at the short distance at the telephoto end, the focusing is performed by retracting the fifth lens unit B5 toward the rear side as indicated by the arrow 5c.

The solid curve 5a and the dotted curve 5b regarding the fifth lens unit B5 are movement loci for correcting the image plane variation accompanying the magnification varying when focusing on the object at infinity and the object at the short distance, respectively. During zooming from the wide angle end to the telephoto end, a change in interval between each pair of adjacent lens units is as follows. An interval between the first lens unit B1 and the second lens unit B2 is increased, an interval between the second lens unit B2 and the third lens unit B3 is decreased, and an interval between the third lens unit B3 and the fourth lens unit B4 is increased. An interval between the fourth lens unit B4 and the fifth lens unit B5 is decreased. During zooming, the lens units are configured to move along mutually different loci.

The first lens unit B1 consists, in order from the object side to the image side, of a cemented lens formed by cementing a negative lens and a positive lens to realize the high zoom ratio and make the entire system compact by means of the positive lead. The second lens unit B2 consists, in order from the object side to the image side, of a negative lens, a negative lens, and a positive lens to realize the wide angle of view, and to generate the large distortion in the wide angle range.

The third lens unit B3 consists, in order from the object side to the image side, of a positive lens, a negative cemented lens formed by cementing a positive lens and a negative lens, and a positive lens to suppress the variation in spherical aberration over the entire zoom range. The fourth lens unit B4 consists of one negative lens and one positive lens (corresponding to the lens element A), and the fifth lens unit B5 consists of one negative lens to make the entire system compact.

The zoom lens in Example 3 consists, in order from an object side to an image side, of a first lens unit B1 having a negative refractive power, a second lens unit B2 having a positive refractive power, a third lens unit B3 having a positive refractive power, a fourth lens unit B4 having a negative refractive power, and a fifth lens unit B5 having a positive refractive power. The fifth lens unit B5 is the lens unit located closest to the image side, and the fourth lens unit B4 corresponds to the lens element A.

During zooming from the wide angle end to the telephoto end, a change in interval between each pair of adjacent lens units is as follows. An interval between the first lens unit B1 and the second lens unit B2 is decreased, an interval between the second lens unit B2 and the third lens unit B3 is decreased, and an interval between the third lens unit B3 and the fourth lens unit B4 is increased. An interval between the fourth lens unit B4 and the fifth lens unit B5 is increased. The lens units are configured to move along mutually different loci during zooming.

Moreover, a rear focus system in which the fifth lens unit B5 is moved on the optical axis to perform focusing is adopted. In a case where focusing is performed from the object at infinity to the object at the short distance at the telephoto end, the focusing is performed by extending the fifth lens unit B5 toward the front side as indicated by the arrow 5c in the lens cross-sectional view. The solid curve 5a and the dotted curve 5b regarding the fifth lens unit B5 indicate movement loci for correcting the image plane variation accompanying zooming from the wide angle end to the telephoto end when focusing on the object at infinity and the object at the short distance, respectively.

The first lens unit B1 consists, in order from the object side to the image side, of a negative lens, a negative lens, and a positive lens to realize the wide angle of view and make the entire system compact by means of the negative lead, and to generate the large distortion in the wide angle range. The second lens unit B2 consists, in order from the object side to the image side, of a positive lens, and a negative cemented lens formed by cementing a positive lens and a negative lens to suppress the variation in spherical aberration over the entire zoom range.

The third lens unit B3 consists of a positive cemented lens formed by cementing a negative lens and a positive lens. The fourth lens unit B4 consists of a negative cemented lens formed by cementing a positive lens and a negative lens. Each of the third lens unit B3 and the fourth lens unit B4 consists of one cemented lens to make the entire system compact, and to suppress the variation in spherical aberration over the entire zoom range. The fifth lens unit B5 consists of one lens to make the entire system compact.

The zoom lens in Example 4 consists, in order from an object side to an image side, of a first lens unit B1 having a negative refractive power, a second lens unit B2 having a positive refractive power, a third lens unit B3 having a positive refractive power, a fourth lens unit B4 having a negative refractive power, a fifth lens unit B5 having a positive refractive power and a sixth lens unit B6 having a negative refractive power. The fifth lens unit B5 corresponds to the lens element A. Moreover, a rear focus system in which the sixth lens unit B6 is moved on the optical axis to perform focusing is adopted. In a case where focusing is performed from the object at infinity to the object at the short distance at the telephoto end, the focusing is performed by retracting the sixth lens unit B6 toward the rear side as indicated by the arrow 6c.

The solid curve 6a and the dotted curve 6b regarding the sixth lens unit B6 are movement loci for correcting the image plane variation accompanying the magnification varying when focusing on the object at infinity and the object at the short distance, respectively. During zooming from the wide angle end to the telephoto end, a change in interval between each pair of adjacent lens units is as follows.

An interval between the first lens unit B1 and the second lens unit B2 is decreased, an interval between the second lens unit B2 and the third lens unit B3 is decreased, an interval between the third lens unit B3 and the fourth lens unit B4 is increased, and an interval between the fourth lens unit B4 and the fifth lens unit B5 is increased. An interval between the fifth lens unit B5 and the sixth lens unit B6 is decreased. The lens units are configured to move along mutually different loci during zooming. Moreover, during focusing from the object at infinity to the object at the short distance, the sixth lens unit B6 is configured to move on the optical axis toward the image side. The movements of the sixth lens unit B6 during zooming and focusing are the same as those in Example 2.

The first lens unit B1 consists, in order from the object side to the image side, of a negative lens, a negative lens, and a positive lens to realize the wide angle of view and make the entire system compact by means of the negative lead, and to generate the large distortion in the wide angle range. The second lens unit B2 consists, in order from the object side to the image side, of a positive lens, and a negative cemented lens formed by cementing a positive lens and a negative lens to suppress the variation in spherical aberration over the entire zoom range.

The third lens unit B3 consists of a positive cemented lens formed by cementing a negative lens and a positive lens. The fourth lens unit B4 consists of a negative cemented lens formed by cementing a positive lens and a negative lens. Each of the third lens unit B3 and the fourth lens unit B4 consists of one cemented lens to make the entire system compact, and to suppress the variation in spherical aberration over the entire zoom range. The fifth lens unit B5 consists of one positive lens, and the sixth lens unit B6 consists of one negative lens. Each of the fifth lens unit B5 and the sixth lens unit B6 consists of one lens to make the entire system compact.

The zoom lens in Example 5 consists, in order from an object side to an image side, of a first lens unit B1 having a negative refractive power, a second lens unit B2 having a positive refractive power, a third lens unit B3 having a negative refractive power, and a fourth lens unit B4 having a positive refractive power. The fourth lens unit B4 is the lens unit located closest to the image side, and the third lens unit B3 corresponds to the lens element A.

During zooming from the wide angle end to the telephoto end, a change in interval between each pair of adjacent lens units is as follows. An interval between the first lens unit B1 and the second lens unit B2 is decreased, an interval between the second lens unit B2 and the third lens unit B3 is increased, and an interval between the third lens unit B3 and the fourth lens unit B4 is increased. The lens units are configured to move along mutually different loci during zooming.

Moreover, a rear focus system in which the fourth lens unit B4 is moved on the optical axis to perform focusing is adopted. In a case where focusing is performed from the object at infinity to the object at the short distance at the telephoto end, the focusing is performed by extending the fourth lens unit B4 toward the front side as indicated by the arrow 4c in the lens cross-sectional view. The solid curve 4a and the dotted curve 4b regarding the fourth lens unit B4 indicate movement loci for correcting the image plane variation accompanying zooming from the wide angle end to the telephoto end when focusing on the object at infinity and the object at the short distance, respectively.

The first lens unit B1 consists, in order from the object side to the image side, of a negative lens, a negative lens, and a positive lens to realize the wide angle of view and make the entire system compact by means of the negative lead, and to generate the large distortion in the wide angle range. The second lens unit B2 consists, in order from the object side to the image side, of a positive lens, a negative cemented lens formed by cementing a positive lens and a negative lens, and a positive lens to suppress the variation in spherical aberration over the entire zoom range. The third lens unit B3 consists of one negative lens to make the entire system compact. The fourth lens unit B4 consists, in order from the object side to the image side, of a positive cemented lens formed by cementing a positive lens and a negative lens to suppress a variation in lateral chromatic aberration during focusing.

Note that, a lens unit may be modified to consist of a single lens or a cemented lens formed by cementing a plurality of lenses as appropriate.

Next, a digital camera (image pickup apparatus) according to an embodiment of the present invention, which uses the zoom lens of the present invention as a photographing optical system is described with reference to FIG. 16. In FIG. 16, a reference numeral 20 represents a digital camera main body. A photographing optical system 21 includes the zoom lens of any one of Examples described above. An image pickup element 22 (photo-electric conversion element) such as a CCD receives light corresponding to the object image by using the photographing optical system 21. A recording unit 23 records data on the object image the light corresponding to which is received by the image pickup element 22. A finder 24 is used to observe the object image displayed on a display element (not shown).

The display element includes a liquid crystal panel or the like. The object image formed on the image pickup element 22 is displayed on the display element. A compact image pickup apparatus having the high optical characteristic can be realized by applying the zoom lens of the present invention to the image pickup apparatus such as a digital camera in such a manner.

Next, numerical value data of Numerical Examples 1 to 5 corresponding to Examples 1 to 5 of the present invention, respectively, is provided. In each set of the numerical value data, i represents the order of the surface from the object side, ri represents a curvature radius of the i-th lens surface, di represents an interval between the i-th surface and the (i+1)th surface, and ndi and vdi represent a refractive index and an Abbe number of a material between the i-th surface and the (i+1)th surface with respect to the d-line, respectively.

Moreover, k, A4, A6, A8, A10, A12, A14, and A16 represent aspherical coefficients, and when a shift amount in the optical axis direction at a position of a height h from the optical axis with respect to a surface vertex is represented by x, an aspherical shape is expressed as:

$$x=(h^2/R)/[1+\{1-(1+k)(h/R)^2\}^{1/2}]+A4h^4+A6h^6+A8h^8+A10h^{10}+A12h^{12}+A14h^{14}+A16h^{16},$$

where R represents a paraxial curvature radius.

A back focus BF indicates a distance from the last lens surface to a paraxial image plane. A total lens length is obtained by adding the back focus to a distance from the surface closest to the object side to the last lens surface. Moreover, correspondences with the conditional expressions in each of Examples are shown in Table 1.

Numerical Example 1

| Unit mm | | | | |
| --- | --- | --- | --- | --- |
| Surface data | | | | |
| Surface Number | r | d | nd | vd |
| 1 | 35.308 | 0.75 | 1.94595 | 18.0 |
| 2 | 27.205 | 2.91 | 1.80420 | 46.5 |
| 3 | 172.941 | (Variable) | | |

-continued

Unit mm

| | | | | |
|---|---|---|---|---|
| 4 | 123.444 | 0.67 | 1.77250 | 49.6 |
| 5 | 9.747 | 5.49 | | |
| 6* | −18.661 | 0.40 | 1.76802 | 49.2 |
| 7 | 261.996 | 0.12 | | |
| 8 | 54.636 | 1.15 | 1.95906 | 17.5 |
| 9 | −95.030 | (Variable) | | |
| 10 (Stop) | ∞ | (Variable) | | |
| 11* | 13.563 | 2.97 | 1.76802 | 49.2 |
| 12* | −60.092 | 0.10 | | |
| 13 | 14.068 | 1.95 | 1.83481 | 42.7 |
| 14 | 74.969 | 0.45 | 1.85478 | 24.8 |
| 15 | 8.737 | 2.60 | | |
| 16 | ∞ | (Variable) | | |
| 17 | 15.255 | 4.55 | 1.49700 | 81.5 |
| 18 | −12.697 | (Variable) | | |
| 19 | −10.432 | 0.40 | 1.75521 | 52.4 |
| 20* | 96.817 | (Variable) | | |
| 21 | 23.816 | 2.94 | 1.61469 | 52.8 |
| 22 | −63.096 | (Variable) | | |
| Image plane | ∞ | | | |

Aspherical surface data

Sixth surface

K = 0.00000e+000  A4 = −5.10955e−007  A6 = −1.36690e−007
A8 = −5.98879e−009  A10 = 4.89476e−011

Eleventh surface

K = 0.00000e+000  A4 = −8.03559e−005  A6 = 2.21434e−007

Twelfth surface

K = 0.00000e+000  A4 = 1.11462e−005  A6 = 4.78150e−007
A8 = 1.96917e−009  A10 = −1.63267e−011

Twentieth surface

K = 0.00000e+000  A4 = 9.17733e−005  A6 = 4.10444e−007
A8 = −2.09626e−008  A10 = 2.23093e−010

Various data
Zoom ratio 4.74

| | Wide angle | Intermediate | Telephoto |
|---|---|---|---|
| Focal length | 9.00 | 22.58 | 42.68 |
| F-number | 2.06 | 3.09 | 4.12 |
| Half angle of view (degree) | 35.71 | 18.73 | 10.47 |
| Image height | 6.47 | 7.65 | 7.89 |
| Total lens length | 60.38 | 65.31 | 77.00 |
| BF | 3.00 | 10.18 | 8.34 |
| d3 | 0.31 | 10.90 | 18.52 |
| d9 | 12.31 | 1.65 | 0.70 |
| d10 | 6.83 | 4.03 | 1.23 |
| d16 | 2.48 | 1.75 | 1.17 |
| d18 | 3.36 | 4.09 | 5.02 |
| d20 | 4.64 | 5.27 | 14.56 |
| d22 | 3.00 | 10.18 | 8.34 |

Zoom lens unit data

| Unit | First surface | Focal length |
|---|---|---|
| B1 | 1 | 58.16 |
| B2 | 4 | −10.64 |
| SP | 10 | ∞ |
| B3 | 11 | 20.27 |
| B4 | 17 | 14.74 |
| B5 | 19 | −12.45 |
| B6 | 21 | 28.49 |

Numerical Example 2

Unit mm

Surface data

| Surface Number | r | d | nd | νd |
|---|---|---|---|---|
| 1 | 31.296 | 0.85 | 1.94595 | 18.0 |
| 2 | 23.955 | 3.11 | 1.80420 | 46.5 |
| 3 | 106.557 | (Variable) | | |
| 4 | 57.646 | 0.67 | 1.77250 | 49.6 |
| 5 | 9.143 | 5.81 | | |
| 6* | −17.113 | 0.40 | 1.76802 | 49.2 |
| 7 | 2,352.440 | 0.10 | | |
| 8 | 45.462 | 1.14 | 1.95906 | 17.5 |
| 9 | −128.137 | (Variable) | | |
| 10 (Stop) | ∞ | (Variable) | | |
| 11* | 14.583 | 2.86 | 1.76802 | 49.2 |
| 12* | −47.081 | 1.06 | | |
| 13 | 14.632 | 1.59 | 1.83481 | 42.7 |
| 14 | 65.330 | 0.45 | 1.85478 | 24.8 |
| 15 | 8.902 | 3.16 | | |
| 16 | ∞ | 1.17 | | |
| 17 | 25.593 | 4.00 | 1.49700 | 81.5 |
| 18 | −10.938 | (Variable) | | |
| 19 | −25.901 | 0.40 | 1.83621 | 42.8 |
| 20* | 43.886 | 2.32 | | |
| 21 | 17.379 | 2.49 | 1.60656 | 43.0 |
| 22 | −65.776 | (Variable) | | |
| 23 | −121.548 | 0.65 | 1.60935 | 62.2 |
| 24 | 24.758 | (Variable) | | |
| Image plane | ∞ | | | |

Aspherical surface data

Sixth surface

K = 0.00000e+000  A4 = 1.28641e−006  A6 = 1.21491e−007
A8 = −1.31342e−008  A10 = 1.25681e−010

Eleventh surface

K = 0.00000e+000  A4 = −1.07907e−004  A6 = 1.16792e−006

Twelfth surface

K = 0.00000e+000  A4 = −1.76924e−005  A6 = 1.64990e−006
A8 = −8.50384e−010  A10 = −1.53185e−011

Twentieth surface

K = 0.00000e+000  A4 = 9.64784e−005  A6 = 3.89331e−007
A8 = 1.27553e−009  A10 = −2.48616e−010

Various data
Zoom ratio 4.72

| | Wide angle | Intermediate | Telephoto |
|---|---|---|---|
| Focal length | 9.04 | 18.02 | 42.68 |
| F-number | 2.06 | 3.09 | 4.12 |
| Half angle of view (degree) | 35.59 | 23.02 | 10.47 |
| Image height | 6.47 | 7.65 | 7.89 |
| Total lens length | 62.00 | 63.40 | 77.00 |
| BF | 7.42 | 14.23 | 20.28 |
| d3 | 0.31 | 5.84 | 19.80 |
| d9 | 13.19 | 5.06 | 0.70 |
| d10 | 5.94 | 3.40 | 0.86 |
| d18 | 0.79 | 1.21 | 2.36 |
| d22 | 2.15 | 1.46 | 0.80 |
| d24 | 7.42 | 14.23 | 20.28 |

Zoom lens unit data

| Unit | First surface | Focal length |
|---|---|---|
| B1 | 1 | 57.95 |
| B2 | 4 | −10.83 |
| SP | 10 | ∞ |
| B3 | 11 | 13.62 |

Numerical Example 3 (continued)

Unit mm

| | | |
|---|---|---|
| B4 | 19 | −625.21 |
| B5 | 23 | −33.70 |

Numerical Example 3

Unit mm

Surface data

| Surface Number | r | d | nd | vd |
|---|---|---|---|---|
| 1* | 98.173 | 1.73 | 1.71166 | 48.2 |
| 2 | 16.453 | 4.76 | | |
| 3* | −90.329 | 0.99 | 1.85135 | 40.1 |
| 4 | 57.235 | 0.38 | | |
| 5 | 35.708 | 1.69 | 1.94595 | 18.0 |
| 6 | 113.336 | (Variable) | | |
| 7 (Stop) | ∞ | (Variable) | | |
| 8* | 21.957 | 3.01 | 1.83614 | 42.5 |
| 9 | −231.870 | 1.32 | | |
| 10 | 19.661 | 3.48 | 1.83586 | 42.7 |
| 11 | −86.236 | 1.40 | 1.85478 | 24.8 |
| 12 | 12.500 | (Variable) | | |
| 13 | 16.786 | 0.68 | 1.83781 | 39.2 |
| 14 | 9.994 | 5.45 | 1.73277 | 53.8 |
| 15 | −33.504 | (Variable) | | |
| 16 | −32.117 | 2.03 | 1.84653 | 23.8 |
| 17 | −13.459 | 0.58 | 1.83629 | 40.8 |
| 18* | 26.978 | (Variable) | | |
| 19 | 49.908 | 3.15 | 1.49700 | 81.5 |
| 20 | −60.395 | (Variable) | | |
| Image plane | ∞ | | | |

Aspherical surface data

First surface

K = 0.00000e+000　　A4 = −7.98556e−006　　A6 = −1.67674e−008
A8 = 2.77032e−010　　A10 = −5.91334e−013

Third surface

K = 0.00000e+000　　A4 = 7.53013e−007　　A6 = −1.77568e−008
A8 = −2.20841e−010　　A10 = −2.23602e−013

Eighth surface

K = 0.00000e+000　　A4 = −9.98361e−006　　A6 = −3.47467e−008
A8 = 2.21342e−010　　A10 = −1.24169e−012

Eighteenth surface

K = 0.00000e+000　　A4 = 5.35227e−005　　A6 = 9.26754e−008
A8 = −1.21473e−009

Various data
Zoom ratio 2.75

| | Wide angle | Intermediate | Telephoto |
|---|---|---|---|
| Focal length | 15.62 | 28.71 | 42.97 |
| F-number | 2.50 | 2.88 | 3.15 |
| Half angle of view (degree) | 35.65 | 24.78 | 17.63 |
| Image height | 11.20 | 13.25 | 13.66 |
| Total lens length | 85.01 | 71.06 | 73.01 |
| BF | 3.00 | 19.72 | 16.57 |
| d6 | 23.87 | 0.90 | 0.83 |
| d7 | 5.69 | 5.98 | 0.09 |
| d12 | 7.91 | 6.38 | 3.87 |
| d15 | 0.77 | 2.32 | 4.69 |
| d18 | 13.12 | 5.10 | 16.31 |
| d20 | 3.00 | 19.72 | 16.57 |

Zoom lens unit data

| Unit | First surface | Focal length |
|---|---|---|
| B1 | 1 | −23.50 |
| SP | 7 | ∞ |
| B2 | 8 | 30.50 |
| B3 | 13 | 17.14 |
| B4 | 16 | −17.32 |
| B5 | 19 | 55.51 |

Numerical Example 4

Unit mm

Surface data

| Surface Number | r | d | nd | vd |
|---|---|---|---|---|
| 1* | 71.757 | 1.73 | 1.72593 | 54.0 |
| 2 | 16.634 | 4.36 | | |
| 3* | −845.569 | 0.99 | 1.85135 | 40.1 |
| 4 | 41.806 | 0.39 | | |
| 5 | 38.970 | 1.48 | 1.94595 | 18.0 |
| 6 | 91.513 | (Variable) | | |
| 7 (Stop) | ∞ | (Variable) | | |
| 8* | 22.484 | 2.42 | 1.83635 | 40.4 |
| 9 | 70.946 | 1.28 | | |
| 10 | 28.848 | 3.39 | 1.83556 | 42.7 |
| 11 | −69.857 | 1.40 | 1.85478 | 24.8 |
| 12 | 53.498 | (Variable) | | |
| 13 | 20.045 | 0.69 | 1.83862 | 35.3 |
| 14 | 9.968 | 7.17 | 1.61385 | 60.6 |
| 15 | −50.851 | (Variable) | | |
| 16 | −44.516 | 2.49 | 1.72800 | 28.5 |
| 17 | −8.679 | 0.59 | 1.79389 | 30.4 |
| 18* | 25.617 | (Variable) | | |
| 19 | 41.856 | 3.72 | 1.83662 | 42.9 |
| 20 | −31.671 | (Variable) | | |
| 21 | −49.442 | 0.68 | 1.49700 | 81.5 |
| 22 | 44.324 | (Variable) | | |
| Image plane | ∞ | | | |

Aspherical surface data

First surface

K = 0.00000e+000　　A4 = −9.74919e−006　　A6 = −6.24164e−009
A8 = 2.08320e−010　　A10 = −3.58322e−013

Third surface

K = 0.00000e+000　　A4 = 2.63433e−006　　A6 = −5.70372e−008
A8 = 3.17559e−010　　A10 = −2.46690e−012

Eighth surface

K = 0.00000e+000　　A4 = −6.73244e−007　　A6 = 5.48987e−009
A8 = −1.15789e−010　　A10 = 2.43864e−013

Eighteenth surface

K = 0.00000e+000　　A4 = 6.56717e−005　　A6 = −1.90965e−007
A8 = −5.11771e−011

Various data
Zoom ratio 2.75

| | Wide angle | Intermediate | Telephoto |
|---|---|---|---|
| Focal length | 15.62 | 29.46 | 42.97 |
| F-number | 2.50 | 2.88 | 2.88 |
| Half angle of view (degree) | 35.65 | 24.22 | 17.63 |
| Image height | 11.20 | 13.25 | 13.66 |

-continued

| Unit mm | | | |
|---|---|---|---|
| Total lens length | 77.50 | 70.79 | 71.01 |
| BF | 13.14 | 17.03 | 20.07 |
| d6 | 24.56 | 2.60 | 0.95 |
| d7 | 0.09 | 4.80 | 0.09 |
| d12 | 1.52 | 1.28 | 0.39 |
| d15 | 0.28 | 2.49 | 7.44 |
| d18 | 1.95 | 4.51 | 6.32 |
| d20 | 3.18 | 5.32 | 2.97 |
| d22 | 13.14 | 17.03 | 20.07 |

Zoom lens unit data

| Unit | First surface | Focal length |
|---|---|---|
| B1 | 1 | −24.07 |
| SP | 7 | ∞ |
| B2 | 8 | 25.09 |
| B3 | 13 | 32.82 |
| B4 | 16 | −17.83 |
| B5 | 19 | 22.06 |
| B6 | 21 | −46.91 |

Numerical Example 5

| Unit mm | | | | |
|---|---|---|---|---|
| Surface data | | | | |
| Surface Number | r | d | nd | νd |
| 1* | 14.969 | 1.00 | 1.70724 | 54.9 |
| 2* | 7.253 | 7.31 | | |
| 3* | −26.832 | 0.69 | 1.78561 | 48.3 |
| 4 | 68.183 | 0.11 | | |
| 5 | 41.935 | 1.12 | 1.94595 | 18.0 |
| 6 | 405.588 | (Variable) | | |
| 7 (Stop) | ∞ | (Variable) | | |
| 8* | 12.221 | 3.01 | 1.76753 | 49.3 |
| 9* | −69.299 | 0.20 | | |
| 10 | 12.446 | 2.89 | 1.62048 | 60.3 |
| 11 | 73.727 | 0.81 | 1.85478 | 24.8 |
| 12 | 8.110 | 4.93 | | |
| 13 | 19.599 | 2.27 | 1.62961 | 59.7 |
| 14 | −20.408 | 1.09 | | |
| 15 | ∞ | (Variable) | | |
| 16* | −15.524 | 0.40 | 1.78979 | 47.7 |
| 17 | −215.472 | (Variable) | | |
| 18 | 19.030 | 2.91 | 1.54701 | 46.9 |
| 19 | −49.109 | 0.70 | 1.83813 | 35.0 |
| 20 | −356.363 | (Variable) | | |
| Image plane | ∞ | | | |

-continued

| Unit mm |
|---|

Aspherical surface data

First surface

K = 0.00000e+000   A4 = −4.10144e−005   A6 = −6.85696e−007
A8 = 6.10172e−009   A10 = −2.70985e−011
Second surface K = 1.16909e+000   A4 = 2.47573e−004   A6 = 1.69133e−007
A8 = −7.54338e−010   A10 = 2.12282e−010   A12 = 3.28956e−013
A14 = −2.84460e−015   A16 = 1.25465e−017
Third surface K = 0.00000e+000   A4 = 1.71033e−005   A6 = −1.20446e−007
A8 = 8.32533e−010   A10 = 2.57147e−011
Eighth surface K = 0.00000e+000   A4 = −6.49780e−005   A6 = 2.13806e−007
A8 = −1.04721e−008   A10 = 7.23248e−011
Ninth surface K = 0.00000e+000   A4 = 2.76384e−005   A6 = 4.61738e−007
A8 = −1.42403e−008   A10 = 1.20091e−010
Sixteenth surface K = 0.00000e+000   A4 = −9.52012e−005   A6 = −2.25032e−007
A8 = 6.13684e−009

Various data
Zoom ratio 3.66

| | Wide angle | Intermediate | Telephoto |
|---|---|---|---|
| Focal length | 6.79 | 12.87 | 24.88 |
| F-number | 1.85 | 2.50 | 2.88 |
| Half angle of view (degree) | 43.60 | 30.74 | 17.59 |
| Image height | 6.47 | 7.65 | 7.89 |
| Total lens length | 60.00 | 54.02 | 54.00 |
| BF | 3.00 | 4.04 | 6.02 |
| d6 | 17.77 | 4.27 | 0.46 |
| d7 | 5.16 | 5.83 | 0.09 |
| d15 | 1.67 | 2.57 | 9.00 |
| d17 | 2.95 | 7.87 | 9.00 |
| d20 | 3.00 | 4.04 | 6.02 |

Zoom lens unit data

| Unit | First surface | Focal length |
|---|---|---|
| B1 | 1 | −13.46 |
| SP | 7 | ∞ |
| B2 | 8 | 13.70 |
| B3 | 16 | −21.20 |
| B4 | 18 | 39.46 |

TABLE 1

| | | Numerical Example | | | | |
|---|---|---|---|---|---|---|
| Conditional expression | | 1 | 2 | 3 | 4 | 5 |
| (1) | $0.2 < di/fw < 1.4$ | 1.176 | 1.130 | 1.234 | 1.089 | 1.355 |
| (2) | $0.2 < df/fw < 1.2$ | 0.516 | 0.238 | 0.840 | 0.204 | 0.418 |
| (3P) | $0.7 < \beta w < 1.0$ | 0.848 | — | 0.925 | — | 0.861 |
| (4P) | $-5.0 < (rf + rr)/(rf - rr) < 0.0$ | −0.452 | — | −0.095 | — | −0.899 |
| (5P) | $1.0 < -fa/fw < 4.0$ | 1.383 | — | 1.109 | — | 3.005 |
| (3N) | $1.0 < \beta w < 1.3$ | — | 1.222 | — | 1.285 | — |
| (4N) | $0.0 < (rf + rr)/(rf - rr) < 5.0$ | — | 0.662 | — | 0.055 | — |
| (5N) | $1.0 < fa/fw < 4.0$ | — | 1.922 | — | 1.412 | — |
| (6) | $0.7 < \phi a/di < 1.4$ | 0.98512 | 1.320897 | 0.77465 | 1.21553 | 1.14465 |
| (7) | $d < -10\%$ | −17.898 | −18.499 | −19.177 | −18.399 | −21.902 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-020173, filed Feb. 4, 2015, which is hereby incorporated by reference herein in its entirety.

What is claimed is:

1. A zoom lens, comprising a plurality of lens units,
wherein an interval between each pair of adjacent lens units is changed during zooming,
wherein the plurality of lens units include:
    a lens unit BR arranged closest to an image side in the zoom lens, which is configured to move in an optical axis direction during focusing; and
    a lens element A arranged adjacent to the lens unit BR on an object side, having a refractive power of a sign opposite to a sign of a refractive power of the lens unit BR,
wherein the lens element A consists of one of a single lens and a cemented lens, and
wherein the following conditional expressions are satisfied:

$$0.2 < di/fw < 1.4; \text{ and}$$

$$0.2 < df/fw < 1.2,$$

where di represents a distance between a surface closest to the image side of the lens element A and an image plane at a wide angle end, df represents a distance between the surface closest to the image side of the lens element A and a surface closest to the object side of the lens unit BR at the wide angle end, and fw represents a focal length of the zoom lens at the wide angle end.

2. A zoom lens according to claim 1, wherein the lens unit BR has a positive refractive power.

3. A zoom lens according to claim 2, wherein the following conditional expression is satisfied:

$$0.7 < \beta w < 1.0,$$

where $\beta w$ represents a lateral magnification of the lens unit BR at the wide angle end.

4. A zoom lens according to claim 2,
wherein the lens unit BR consists of one of a single lens having a positive refractive power and a cemented lens having a positive refractive power, and
wherein the following conditional expression is satisfied:

$$-5.0 < (rf+rr)/(rf-rr) < 0.0,$$

where rf and rr represent curvature radii of the surface closest to the object side and a surface closest to the image side of the lens unit BR, respectively.

5. A zoom lens according to claim 2, wherein the following conditional expression is satisfied:

$$1.0 < -fa/fw < 4.0,$$

where fa represents a focal length of the lens element A.

6. A zoom lens according to claim 2,
wherein the zoom lens consists, in order from the object side to the image side, of a first lens unit having a positive refractive power, a second lens unit having a negative refractive power, a third lens unit having a positive refractive power, a fourth lens unit having a positive refractive power, a fifth lens unit having a negative refractive power, and a sixth lens unit having a positive refractive power, and
wherein the first lens unit to the sixth lens unit are configured to move along mutually different loci during zooming.

7. A zoom lens according to claim 2,
wherein the zoom lens consists, in order from the object side to the image side, of a first lens unit having a negative refractive power, a second lens unit having a positive refractive power, a third lens unit having a positive refractive power, a fourth lens unit having a negative refractive power, a fifth lens unit having a positive refractive power, and
wherein the first lens unit to the fifth lens unit are configured to move along mutually different loci during zooming.

8. A zoom lens according to claim 2,
wherein the zoom lens consists, in order from the object side to the image side, of a first lens unit having a negative refractive power, a second lens unit having a positive refractive power, a third lens unit having a negative refractive power, and a fourth lens unit having a positive refractive power, and
wherein the first lens unit to the fourth lens unit are configured to move along mutually different loci during zooming.

9. A zoom lens according to claim 1, wherein the lens unit BR has a negative refractive power.

10. A zoom lens according to claim 9, wherein the following conditional expression is satisfied:

$$1.0 < \beta w < 1.3,$$

where $\beta w$ represents a lateral magnification of the lens unit BR at the wide angle end.

11. A zoom lens according to claim 9,
wherein the lens unit BR consists of one of a single lens having a negative refractive power and a cemented lens having a negative refractive power, and
wherein the following conditional expression is satisfied:

$$0.0 < (rf+rr)/(rf-rr) < 5.0,$$

where rf and rr represent curvature radii of the surface closest to the object side and a surface closest to the image side of the lens unit BR, respectively.

12. A zoom lens according to claim 9, wherein the following conditional expression is satisfied:

$$1.0 < fa/fw < 4.0,$$

where fa represents a focal length of the lens element A.

13. A zoom lens according to claim 9,
wherein the zoom lens consists, in order from the object side to the image side, of a first lens unit having a positive refractive power, a second lens unit having a negative refractive power, a third lens unit having a positive refractive power, a fourth lens unit having a negative refractive power, a fifth lens unit having a negative refractive power, and
wherein the first lens unit to the fifth lens unit are configured to move along mutually different loci during zooming.

14. A zoom lens according to claim 9,
wherein the zoom lens consists, in order from the object side to the image side, of a first lens unit having a negative refractive power, a second lens unit having a positive refractive power, a third lens unit having a positive refractive power, a fourth lens unit having a negative refractive power, a fifth lens unit having a positive refractive power, and a sixth lens unit having a negative refractive power, and wherein the first lens unit to the sixth lens unit are configured to move along mutually different loci during zooming.

15. A zoom lens according to claim 1, further comprising an aperture stop, which determines an open f-number light beam,
wherein the following conditional expression is satisfied:

0.7<φa/di<1.4, where φa represents an optically effective diameter of the surface closest to the image side of the lens element A.

16. An image pickup apparatus, comprising a zoom lens comprising a plurality of lens units and an image pickup element configured to receive light corresponding to an image formed by the zoom lens,
wherein an interval between each pair of adjacent lens units is changed during zooming,
wherein the plurality of lens units include:
a lens unit BR arranged closest to an image side in the zoom lens, which is configured to move in an optical axis direction during focusing; and
a lens element A arranged adjacent to the lens unit BR on an object side, having a refractive power of a sign opposite to a sign of a refractive power of the lens unit BR,
wherein the lens element A consists of one of a single lens and a cemented lens, and
wherein the following conditional expressions are satisfied:

0.2<di/fw<1.4; and 0.2<df/fw<1.2, where di represents a distance between a surface closest to the image side of the lens element A and an image plane at a wide angle end, df represents a distance between the surface closest to the image side of the lens element A and a surface closest to the object side of the lens unit BR at the wide angle end, and fw represents a focal length of the zoom lens at the wide angle end.

17. An image pickup apparatus according to claim 16, wherein the following conditional expression is satisfied:

ωw≥30°, where ωw represents a photographing half angle of view at the wide angle end.

* * * * *